US012162629B2

(12) United States Patent
Cooley et al.

(10) Patent No.: US 12,162,629 B2
(45) Date of Patent: Dec. 10, 2024

(54) ADAPTABLE QUENCH COIL GUN

(71) Applicant: The Florida State University Research Foundation, Inc., Tallahassee, FL (US)

(72) Inventors: Lance D. Cooley, Tallahassee, FL (US); Christian M. Hubicki, Tallahassee, FL (US)

(73) Assignee: The Florida State University Research Foundation, Inc., Tallahassee, FL (US)

( * ) Notice: Subject to any disclaimer, the term of this patent is extended or adjusted under 35 U.S.C. 154(b) by 0 days.

(21) Appl. No.: 17/992,588

(22) Filed: Nov. 22, 2022

(65) Prior Publication Data
US 2024/0116653 A1    Apr. 11, 2024

Related U.S. Application Data

(60) Provisional application No. 63/281,854, filed on Nov. 22, 2021.

(51) Int. Cl.
*B64G 1/00*    (2006.01)
*H01F 6/00*    (2006.01)
*H01F 6/02*    (2006.01)

(52) U.S. Cl.
CPC .......... *B64G 1/002* (2013.01); *H01F 6/003* (2013.01); *H01F 6/02* (2013.01)

(58) Field of Classification Search
CPC .............. F41B 6/00; B64G 1/002; H01F 6/02
USPC .............................................................. 89/8
See application file for complete search history.

(56) References Cited

U.S. PATENT DOCUMENTS

| | | | | |
|---|---|---|---|---|
| 5,182,254 A | * | 1/1993 | Owens | F41B 6/006 |
| | | | | 73/12.05 |
| 11,810,712 B2 | * | 11/2023 | Labombard | H01F 41/048 |
| 2020/0211744 A1 | * | 7/2020 | Labombard | H01F 6/02 |
| 2020/0279681 A1 | * | 9/2020 | Radovinsky | H01F 6/04 |

OTHER PUBLICATIONS

Hahn S, Park D K, Bascuñán J and Iwasa Y 2011 HTS pancake coils without turn-to-turn insulation IEEE Trans. Appl. Supercond. 21 1592-5.
Hahn S, Kim Y, Park D K, Kim K, Voccio J, Bascuñán J and Iwasa Y 2013 No-insulation multi-width winding technique for high temperature superconducting magnet Appl. Phys. Lett. 103 173511.
Choi Y S, Kim D L and Hahn S 2011 Progress on the development of a 5 T HTS insert magnet for GHz class NMR applications IEEE Trans. Appl. Supercond. 21 1644-8.

(Continued)

*Primary Examiner* — John Cooper
(74) *Attorney, Agent, or Firm* — Meunier Carlin & Curfman LLC

(57) ABSTRACT

Example coil guns and methods of using coil guns are described herein. An example coil gun includes a first pancake module; a second pancake module, where the first pancake module and the second pancake module are each formed of a winding with an inner superconducting material layer and an outer ordinary conductor layer, where the first pancake module and the second pancake module are physically and/or inductively coupled to propagate a quench of a superconducting state of the first pancake module to the second pancake module.

19 Claims, 12 Drawing Sheets

(56) References Cited

OTHER PUBLICATIONS

Yoon S, Cheon K, Lee H, Moon S, Kim S, Kim Y, Park S, Choi K and Hong G 2014 Fabrication and characterization of 4-T/203 mm RT bore 2G HTS magnet with no-insulation method IEEE Trans. Appl. Supercond. 24 4602904.

Hahn S, Song J, Kim Y, Lecrevisse T, Chu Y, Voccio J, Bascuñan J and Iwasa Y 2015 Construction and test of 7-T/68-mm cold bore multi-width no-insulation GdBCO magnet IEEE Trans. Appl. Supercond. 25 4600405.

Yoon S, Kim J, Cheon K, Lee H, Hahn S and Moon S 2016 26 T 35 mm all-GdBa2Cu30 7-x multi-width no-insulation superconducting magnet Supercond. Sci. Technol. 29 04LT04.

Liu J et al 2016 Generation of 24 T with an all superconducting magnet IEEE/CSC and ESAS Superconductivity News Forum 10 35-STH39 https://snf.ieeecsc.org/abstracts/generation-24-t-all-superconducting-magnet.

Painter T et al 2017 Design, construction and operation of a 13 T 52 mm no insulation REBCO insert for a 20 T all superconducting user magnet 25th International Conf. on Magnet Technology (Amsterdam), Or31-03 https://indico.cern.ch/event/445667/contributions/2562082/.

Liu J, Wang L, Qin L, Wang Q and Dai Y 2018 Recent Development of the 25 T All-Superconducting Magnet at Iee IEEE Trans. Appl. Supercond. 28 4301305.

Park D, Bascuñán J, Michael P C, Lee J, Hahn S and Iwasa Y 2018 Construction and test results of coils 2 and 3 of a 3-Nested-Coil 800-MHz REBCO insert for the MIT 1.3-GHz LTS/HTS NMR magnet IEEE Trans. Appl. Supercond. 28 4300205.

Jang J Y, Yoon S, Hahn S, Hwang Y J, Kim J, Shin K H, Cheon K and Kim K 2017 Y.J. Hong, 'Design, construction and 13 K conduction-cooled operation of a 3 T 100 mm stainless steel cladding all-REBCO magnet' Supercond. Sci. Technol. 30 105012.

Lécrevisse T, Badel A, Benkel T, Chaud X, Fazilleau P and Tixador P 2018 Metal-as-insulation variant of No. insulation HTS winding technique: pancake tests under high background magnetic field and high current at 4.2 K Supercond. Sci. Technol. 31 055008.

Suetomi Y, Takahashi S, Takao T, Maeda H and Yanagisawa Y 2019 A novel winding method for a noinsulation layer-wound REBCO coil to provide a short magnetic field delay and self-protect characteristics Supercond. Sci. Technol. 32 045003.

Scheidler J J and Tallerico T F 2018 Design, fabrication, and critical current testing of no-insulation superconducting rotor coils for NASA's 1.4 MW high-efficiency megawatt motor AIAA/IEEE Electric Aircraft Technologies Symposium p. 5002.

Choi J, Lee C, Hwang C, Kim S, Cho S, Park M and Yu I 2018 An effective cryostat design of conduction-cooled HTS magnets for a 300-kW-class superconducting induction heater IEEE Trans. Appl. Supercond. 28 4601705.

Hahn S et al.2019 45.5-tesla direct-current magnetic field generated with a high-temperature superconducting magnet Nature 570 496-9.

Wang X, Hahn S, Kim Y, Bascuñan J, Voccio J, Lee H G and Iwasa Y 2012 Turn-to-turn contact characteristics for an equivalent circuit model of no-insulation ReBCO pancake coil Supercond. Sci. Technol. 26 035012.

Bhattarai K R, Kim K, Kim S, Lee S G and Hahn S 2017 Quench analysis of a multiwidth no-insulation 7-T 78-mm REBCO magnet IEEE Trans. Appl. Supercond. 27 4603505.

Yang D G, Song J B, Choi Y H, Kim S G, Choi Y S and Lee H 2017 A study on electrical characteristics of multilayered metallic-insulation coils IEEE Trans. Appl. Supercond. 27 7700206.

Yanagisawaa Y, Satoa K, Yanagisawaa K, Nakagomeb H, Jina X, Takahashia M and Maedaa H 2014 Basic mechanism of self-healing from thermal runaway from uninsulated REBCO pancake coils Physica C 499 40-4.

Markiewicz W D, Jaroszynski J J, Abraimov D V, Joyner R E and Khan A 2016 Quench analysis of pancake wound REBCO coils with low resistance between turns Supercond. Sci. Technol. 29 025001.

Song H and Wang Y 2015 Simulations of nonuniform behaviors of multiple No. insulation (RE)Ba2Cu30 7-x HTS pancake coils during charging and discharging IEEE Trans. Appl. Supercond. 26 4700105.

Song J-B, Hahn S, Lecrevisse T, Voccio J, Bascuñan J and Iwasa Y 2015 Over-current quench test and self-protecting behavior of a 7 T/78 mm multi-width no-insulation REBCO magnet at 4.2 K Supercond. Sci. Technol. 28 114001.

Wang T, Noguchi S, Wang X, Arakawa I, Minami K, Monma K, Ishiyama A, Hahn S and Iwasa Y 2015 Analyses of transient behaviors of no-insulation REBCO pancake coils during sudden discharging and overcurrent IEEE Trans. Appl. Supercond. 25 4603409.

Ikeda A, Oki T, Wang T, Ishiyama A, Monma K, Noguchi S, Watanabe T and Nagaya S 2016 Transient behaviors of noinsulation REBCO pancake coil during local normal-state transition IEEE Trans. Appl. Supercond. 26 4600204.

Wang Y, Chan W K and Schwartz J 2016 Self-protection mechanisms in no-insulation (RE)Ba2Cu3Ox high temperature superconductor pancake coils Supercond. Sci. Technol. 29 045007.

Wang Y, Zhang M, Yuan W, Hong Z, Jin Z and Song H 2017 Non-uniform ramping losses and thermal optimization with turn-to-turn resistivity grading in a (RE)Ba2Cu3Ox magnet consisting of multiple no-insulation pancake coils J. Appl. Phys. 122 053902.

Liu D, Zhang W, Yong H and Zhou Y 2018 Thermal stability and mechanical behavior in no-insulation high-temperature superconducting pancake coils Supercond. Sci. Technol. 31 085010.

Miyao R, Igarashi H, Ishiyama A and Noguchi S 2017 Thermal and electromagnetic simulation of multi-stacked noinsulation REBCO pancake coils on normal-state transition by PEEC model IEEE Trans. Appl. Supercond. 28 4601406.

Garrett M W 1963 Calculation of fields, forces, and mutual inductances of current systems by elliptic integrals J. Appl. Phys. 34 2567.

Thieme C L H, Gagnon K J, Coulter J Y, Song H and Schwartz J 2009 Stability of second generation HTS pancake coils at 4.2 K for high heat flux applications IEEE Trans. Appl. Supercond. 19 1626.

Hilton D K, Gaverlin A V and Trociewitz U P 2015 Practical fit functions for transport critical current versus field magnitude and angle data from (RE)BCO coated conductors at fixed low temperatures and in high magnetic fields Supercon. Sci. Technol. 28 074002.

Senatore C, Barth C, Bonura M, Kulich M and Mondonico G 2015 Field and temperature scaling of the critical current density in commercial REBCO coated conductors Supercon. Sci. Technol. 29 014002.

Iwasa Y 2009 Case Studies in Superconducting Magnets (New York: Springer) (https://doi.org/10.1007/b112047).

Gyuraki R, Benkel T, Schreiner F, Sirois F and Grilli F 2019 Fluorescent thermal imaging of a non-insulated pancake coil wound from high temperature superconductor tape Supercond. Sci. Technol. 32 105006.

Bobrov E S and Williams Je C 1980 Stresses in superconducting solenoids Mechanics of Superconducting Structures 41 13-41.

Lu J, Goddard R, Han K and Hahn S 2017 Contact resistance between two REBCO tape under load and load cycles Supercond. Sci. Technol. 30 045005.

Noguchi S, Kim K and Hahn S 2018 Simulation on electrical field generation by hall effect in no-insulation REBCO pancake coils IEEE Trans. Appl. Supercond. 28 4901805.

Michael P C, Park D, Choi Y H, Lee J, Li Y, Bascuñan J, Noguchi S, Hahn S and Iwasa Y 2019 Assembly and Test of a 3-Nested-Coil 800-MHz REBCO Insert (H800) for the MIT 1.3 GHz LTS/HTS NMR Magnet IEEE Trans. Appl. Supercond. 29 4300706.

Park D, Bascuñan J, Michael P C, Lee J, Hyuck Choi Y, Li Y, Hahn S and Iwasa Y 2019 MIT 1.3-GHz LTS/HTS NMR magnet: post quench analysis and new 800-MHz insert design IEEE Trans. Appl. Supercond. 29 4300804.

Noguchi S, Park D, Choi Y, Lee J, Li Y, Michael P C, Bascunan J, Hahn S and Iwasa Y 2019 Quench analyses of the MIT 1.3-GHz LTS/HTS NMR magnet IEEE Trans. Appl. Supercond. 29 4301005.

Echarri A 1966 Remanent induction in a hard superconductor Phys. Lett. 20 619-21.

(56) References Cited

OTHER PUBLICATIONS

Frankel D J 1979 Critical-state model for the determination of critical currents in disk-shaped superconductors J. Appl. Phys. 50 5402-7.

Hull J R and Murakami M 2004 Applications of bulk hightemperature superconductors Proc. IEEE 92 1705-18.

Ravi-Persad S et al.2013 Production run of 2 cm diameter YBCO trapped field magnets with surface field of 2 T at 77 K Supercond. Sci. Technol. 26 105014.

Nariki S, Sakai N and Murakami M 2005 Melt-processed Gd—Ba—Cu—O superconductor with trapped field of 3 T at 77 K Supercond. Sci. Technol. 18 S126.

Tomita M and Murakami M 2003 High-temperature superconductor bulk magnets that can trap magnetic fields of over 17 tesla at 29 K Nature 421 517-20.

Gruss S et al 2001 Superconducting bulk magnets: very high trapped fields and cracking Appl. Phys. Lett. 79 3131-3.

Oka T et al 2014 Strong magnetic field generator containing HTS bulk magnets and compact refrigerators IEEE Trans. Appl. Supercond. 24 1-4.

Ren Y et al 1995 Damage caused by magnetic pressure at high trapped field in quasi-permanent magnets composed of melttextured Y—Ba—Cu—O superconductor Phys. C: Supercond. 251 15-26.

Fuchs G et al 2000 Trapped magnetic fields larger than 14 T in bulk YBa2Cu307-x Appl. Phys. Lett. 76 2107-9.

Krabbes G et al 2006 High Temperature Superconductor Bulk Materials (Weinheim: Wiley) p. 181.

Johansen T H 2000 Flux-pinning-induced stress and magnetostriction in bulk superconductors Supercond. Sci. Technol. 13 R121.

Shi Y et al 2010 Batch-processed GdBCO—Ag bulk superconductors fabricated using generic seeds with high trapped fields Phys. C: Supercond. 470 685-8.

Ainslie M D et al.2014 Modelling and comparison of trapped fields in (RE)BCO bulk superconductors for activation using pulsed field magnetization Supercond. Sci. Technol. 27 065008.

Shigley J E and Mischke C R 2001 Mechanical Engineering Design 6th edn (New York: McGraw-Hill Education) pp. 62-63.

Lei M et al 1993 Elastic constants of a monocrystal of superconducting YBCO Phys. Rev. B 47 6154-6.

Beasley M R, Labusch R and Webb W W 1969 Flux creep in Type-II superconductors Phys. Rev. 181 682-700.

Krabbes G et al 2006 High Temperature Superconductor Bulk Materials (Weinheim: Wiley) p. 92.

Lougher W and Vondra L 2000 Design of compression shrinkfit ceramic-steel wear ring assembly for chemical mechanical planarization J. Vac. Sci. Technol. B 18 2597-602.

Durrell J H et al 2014 A trapped field of 17.6 T in meltprocessed, bulk Gd—Ba—Cu—O reinforced with shrink-fit steel Supercond. Sci. Technol. 27 082001.

Fuchs G, Häßler W, Nenkov K, Scheiter J, Perner O, Handstein A, Kanai T, Schultz L and Holzapfel B 2013 High trapped fields in bulk MgB2 prepared by hot-pressing of ball-milled precursor powder Supercond. Sci. Technol. 26 122002.

Weiss J D, Yamamoto A, Polyanskii A A, Richardson R B, Larbalestier D C and Hellstrom E E 2015 Demonstration of an iron-pnictide bulk superconducting magnet capable of trapping over 1 T Supercond. Sci. Technol. 28 112001.

Yanagi Y, Yoshikawa M, Itoh Y, Oka T, Ikuta H and Mizutani U 2004 Generation of extremely strong magnetic fields in open space by using metal-ring-reinforced 60 mmØ Sm—Ba—Cu—O superconducting bulk Physica C vol. 412-414, pp. 744-749.

Saho N, Nishijima N, Tanaka H and Sasaki A 2009 Development of portable superconducting bulk magnet system Physica C 469 1286-9.

Nakamura T, Tamada D, Yanagi Y, Itoh Y, Nemoto T, Utumi H and Kose K 2015 Development of a superconducting bulk magnet for NMR and MRI J. Magn. Reson. 259 68-75.

Tomita M, Fukumoto Y, Ishihara A, Akasaka T, Ohsaki H and Sekino M 2016 Evaluation of temperature dependence of magnetic field distributions of bulk superconductor annuli IEEE Trans. Appl. Supercond. 26 8801304.

Zhou D, Ainslie M D, Shi Y-H, Dennis A R, Huang K Y, Hull J R, Cardwell D A and Durrell J H 2017 A portable magnetic field of >3 T generated by the flux jump assisted, pulsed field magnetization of bulk superconductors Appl. Phys. Lett. 110 062601.

Radebaugh R 2009 Cryocoolers: the state of the art and recent developments J. Phys.: Condens. Matter 21 164219.

Weinstein R, Parks D, Sawh R-P, Carpenter K and Davey K 2015 A significant advantage for trapped field magnet applications—a failure of the critical state model Appl. Phys. Lett. 107 152601.

Pankhurst Q A, Connolly J, Jones S K and Dobson J 2003 Applications of magnetic nanoparticles in biomedicine J. Phys. D: Appl. Phys. 36 R167.

Wu W, Wu Z, Yu T, Jiang C and Kim W-S 2015 Recent progress on magnetic iron oxide nanoparticles: synthesis, surface functional strategies and biomedical applications Sci. Technol. Adv. Mater. 16 023501.

Barnsley L C, Carugo D, Owen J and Stride E 2015 Halbach arrays consisting of cubic elements optimised for high field gradients in magnetic drug targeting applications Phys. Med. Biol. 60 8303-27.

Saho N, Matsuda K and Nishijima N 2012 Palm-size miniature superconducting bulk magnet Cryogenics 52 604-8.

Liberti P A, Rao C G and Terstappen L W 2001 Optimization of ferrofluids and protocols for the enrichment of breast tumor cells in blood J. Magn. Mater. 225 301-7.

Paul F, Melville D, Roath S and Warhurst D 1981 A bench top magnetic separator for malarial parasite concentration IEEE Trans. Magn. 17 2822-4.

Seesod N, Nopparat P, Hedrum A, Holder A, Thaithong S, Uhlen M and Lundeberg J 1997 An integrated system using immunomagnetic separation polymerase chain reaction, and colorimetric detection for diagnosis of Plasmodium falciparum Am. J. Tropical Med. Hyg. 56 322-8.

Owen J, Rademeyer P, Chung D, Cheng Q, Holroyd D, Coussios C, Friend P, Pankhurst Q A and Stride E 2015 Magnetic targeting of microbubbles against physiologically relevant flow conditions Interface Focus 5 20150001.

Nakagawa K, Mishima F, Akiyama Y and Nishijima S 2012 Study on magnetic drug delivery system using HTS bulk magnet IEEE Trans. Appl. Supercond. 22 4903804.

Pankhurst Q A, Thanh N T K, Jones S K and Dobson J 2009 Progress in applications of magnetic nanoparticles in biomedicine J. Phys. D: Appl. Phys. 42 224001.

Nakamura T, Itoh Y, Yoshikawa M, Oka T and Uzawa J 2007 Development of a superconducting magnet for nuclear magnetic resonance using bulk high-temperature superconducting materials Concepts. Magn. Reson. B 31B 65-70.

Nakamura T, Itoh Y, Yoshikawa M, Sakai N, Nariki S, Hirabayshi I and Utsumi H 2011 Application of a compact cryogen-free superconducting bulk magnet to Nmr Teion Kogaku (J. Cryog. Supercond. Soc. Jpn.) 46, 139-48.

Ogawa K, Nakamura T, Terada Y, Kose K and Haishi T 2011 Development of magnetic resonance microscope using a high Tc bulk superconducting magnet Appl. Phys. Lett. 98 234101.

Takahashi K, Fujishiro H and Ainslie M D 2018 A new concept of a hybrid trapped field magnet lens (HTFML) Supercond. Sci. Technol. 31 044005.

Fujishiro H, Mochizuki H, Naito T, Ainslie M D and Giunchi G 2016 Flux jumps in high-Jc MgB2 bulks during pulsed field magnetization Supercond. Sci. Technol. 29 034006.

Zou J, Ainslie M D, Fujishiro H, Bhagurkar A G, Naito T, Hari Babu N, Fagnard J-F, Vanderbemden P and Yamamoto A 2015 Numerical modelling and comparison of MgB2 bulks fabricated by HIP and infiltration growth Supercond. Sci. Technol. 28 075009.

Ainslie M D, Yamamoto A, Fujishiro H, Weiss J D and Hellstrom E E 2017 Numerical modelling of iron-pnictide bulk superconductor magnetization Supercond. Sci. Technol. 30 105009.

Yokoyama K, Kulawansha E, Yuanding Z and Oka T 2016 Development of a desktop-type superconducting bulk magnet IEEE Trans. Appl. Supercond. 26 4601204.

(56) References Cited

OTHER PUBLICATIONS

Yokoyama K, Katsuki A, Miura A and Oka T 2018 Enhancement of trapped magnetic field using a large-size REBCO bulk in a desktop type superconducting bulk magnet IEEE Trans. Appl. Supercond. 28 6800304.

Fujishiro H, Mochizuki H, Ainslie M D and Naito T 2016 Trapped field of 1.1 T without flux jumps in an MgB2 bulk during pulsed field magnetization using a split coil with a soft iron yoke Supercond. Sci. Technol. 29 084001.

Ainslie M D and Fujishiro H 2015 Modelling of bulk superconductor magnetization Supercond. Sci. Technol. 28 053002.

Waide P and Brunner C U 2011 Energy-efficiency policy opportunities for electric motor-driven systems International Energy Agency Energy Paper No. 2011/07 (https://doi.org/10.1787/5kgg52gb9gjden).

Huang S, Luo J, Leonardi F and Lipo T A 1998 A general approach to sizing and power density equations for comparison of electrical machines IEEE Trans. Ind. Appl. 34 92-7.

Ainslie M D, George A, Shaw R, Dawson L, Winfield A, Steketee M and Stockley S 2014 Design and market considerations for axial flux superconducting electric machine design J. Phys.: Conf. Ser. 507 032002.

Zhou D, IzumiM,MikiM, Felder B, Ida T and KitanoM2012 An overview of rotating machine systems with high-temperature bulk superconductors Supercond. Sci. Technol. 25 103001.

Zhang Y, Zhou D, Ida T, Miki M and Izumi M 2016 Meltgrowth bulk superconductors and application to an axialgap-type rotating machine Supercond. Sci. Technol. 29 044005.

Haran K S, Kalsi S, Arndt T, Karmaker H, Badcock R, Buckley B, Haugan T, Izumi M, Loder D and Bray J W 2017 High power density superconducting rotating machines development status and technology roadmap Supercond. Sci. Technol. 30 123002.

Fujishiro H, Tateiwa T, Fujiwara A, Oka T and Hayashi H 2006 Higher trapped field over 5 T on HTSC bulk by modified pulse field magnetizing Physica C 445-448 334-8.

Gouge M J, Demko J A, McConnell B W and Pfotenhauer J M 2002 Cryogenics Assessment Report (Oak Ridge National Laboratory) 20 pages.

Armstrong M, Ross C, Blackwelder M and Rajashekara K 2012 Propulsion system component considerations for NASA N3-X turboelectric distributed propulsion system SAE Int. J. Aerosp. 5 344-53.

Berg F, Palmer J, Miller P and Dodds G 2017 HTS system and component targets for a distributed aircraft propulsion system IEEE Trans. Appl. Supercond. 27 3600307.

Felder J L, Brown G V, DaeKim H and Chu J 2011 Turboelectric distributed propulsion in a hybrid electric wing body aircraft 20th Int. Society for Airbreathing Engines (ISABE 2011) ISABE-2011-1340.

Luongo C A, Masson P J, Nam T, Mavris D, Kim HD, Brown G V, Waters M and Hall D 2009 Next generation more-electric aircraft: a potential application for HTS superconductors IEEE Trans. Appl. Supercond. 19 1055-68.

Yanamoto T, Izumi M, Yokoyama M and Umemoto K 2015 Electric propulsion motor development for commercial ships in Japan Proc. IEEE 103 2333-43.

Claycomb J 1999 Magnetic shields Applied Superconductivity: Handbook on Devices and Applications vol. 1 ed P Seidel (New York: Wiley) pp. 780-806.

Barna D 2017 High field septum magnet using a superconducting shield for the Future Circular Collider Phys. Rev. Accel. Beams 20 041002.

Souc J, Solovyov M, Gömöry F, Prat-Camps J, Navau C and Sanchez A 2013 A quasistatic magnetic cloak New J. Phys. 15 053019.

Takahata K, Nishijima S, Ohgami M, Okada T, Nakagawa S and Yoshiwa M 1989 Magnetic shielding by a tubular superconducting winding in parallel and transverse fields IEEE Trans. Magn. 25 1889.

Rabbers J J, Oomen M P, Bassani E, Ripamonti G and Giunchi G 2010 Magnetic shielding capability of MgB2 cylinders Supercond. Sci. Technol. 23 125003.

Fagnard J F, Elschner S, Bock J, Dirickx M, Vanderheyden B and Vanderbemden P 2010 Shielding efficiency and E(J) characteristics measured on large melt cast Bi-2212 hollow cylinders in axial magnetic fields Supercond. Sci. Technol. 23 095012.

Wera L, Fagnard J F, Namburi D K, Shi Y, Vanderheyden B and Vanderbemden P 2017 Magnetic shielding above 1 T at 20 K with bulk, large grain YBCO tubes made by buffer-aided top seeded melt growth IEEE Trans. Appl. Supercond. 27 6800305.

Yang P T, Yang W M and Chen J L 2017 Fabrication and properties of single domain GdBCO superconducting rings by a buffer aided Gd+011 TSIG method Supercond. Sci. Technol. 30 085003.

Tomkow L, Ciszek M and Chorowski M 2015 Combined magnetic screen made of Bi-2223 bulk cylinder and YBCO tape rings: modeling and experiments J. Appl. Phys. 117 043901.

Gozzelino L, Gerbaldo R, Ghigo G, Laviano F, Truccato M and Agostino A 2016 Superconducting and hybrid systems for magnetic field shielding Supercond. Sci. Technol. 29 034004.

Giunchi G, Barna D, Bajas H, Brunner K, Német A and Petrone C 2018 Creep and relaxation phenomena in a long MgB2 tube subjected to transverse magnetic field, at 4.2 K IEEE Trans. Appl. Supercond. 28 6801705.

Doyle R A, Bradley A D, Lo W, Cardwell D A, Campbell A M, Vanderbemden P and Cloots R 1998 High field behavior of artificially engineered boundaries in meltprocessed YBa2Cu3O7-δ Appl. Phys. Lett. 73 117.

Kvitkovic J, Davis D, Zhang M and Pamidi S 2015 Magnetic shielding characteristics of second generation high temperature superconductors at variable temperatures obtained by cryogenic helium gas circulation IEEE Trans. Appl. Supercond. 25 8800304.

\* cited by examiner

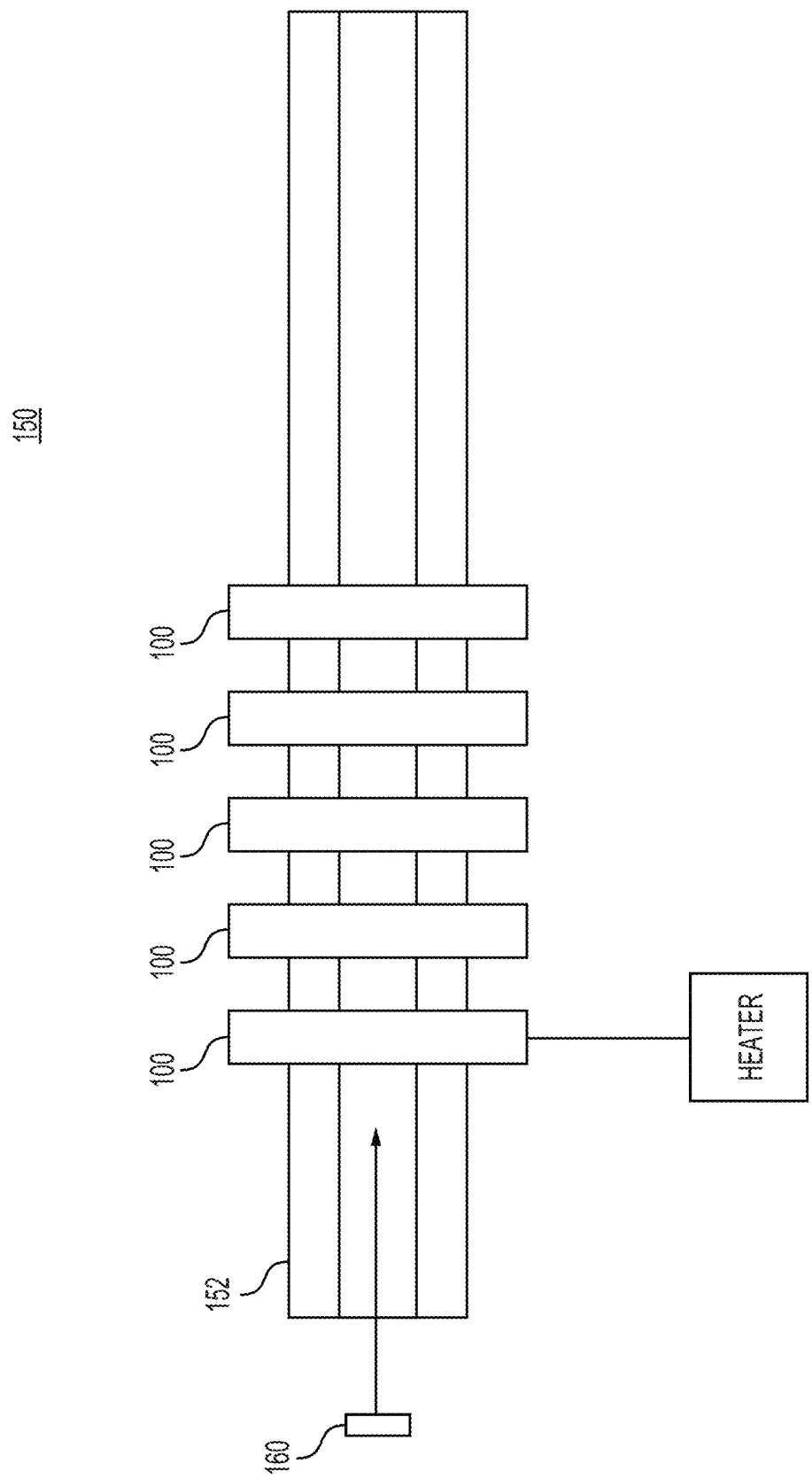

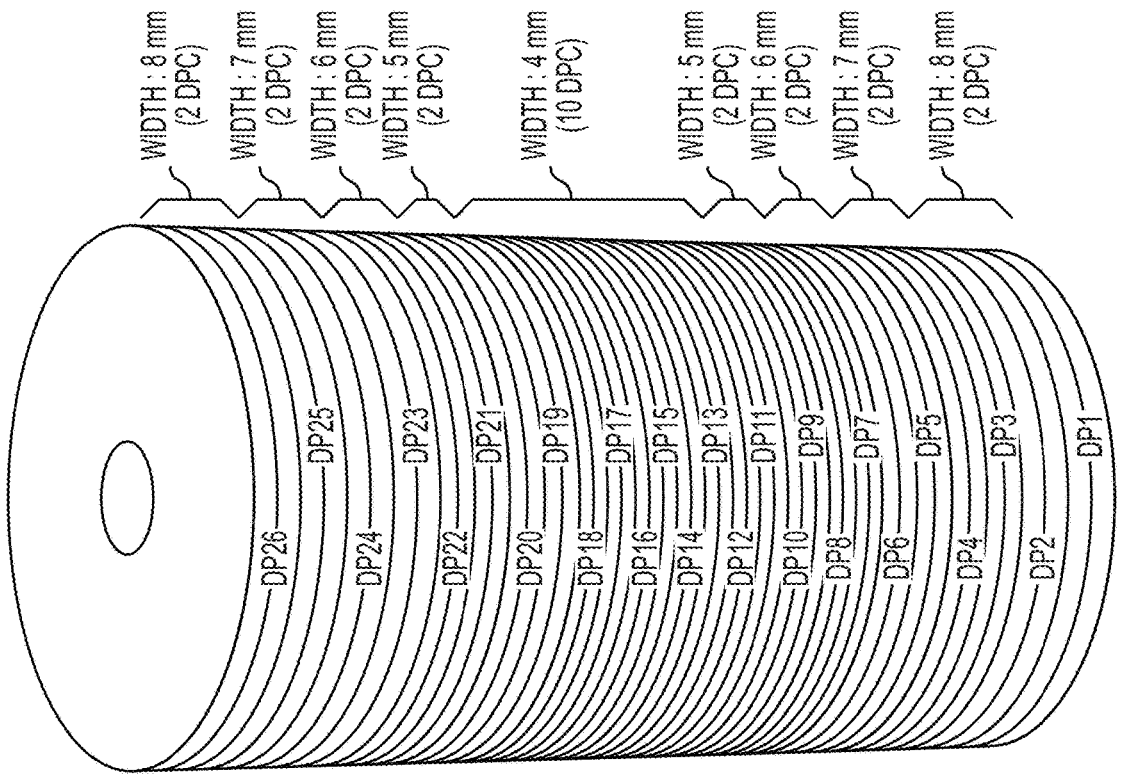
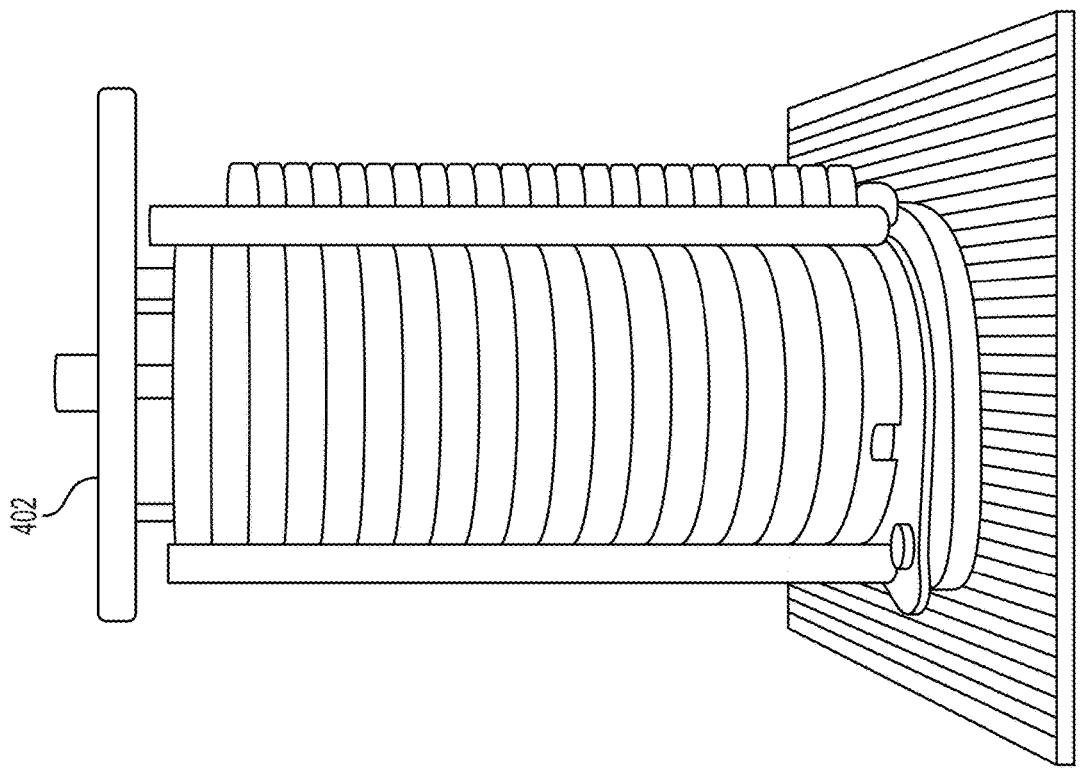
FIG. 4B
FIG. 4A

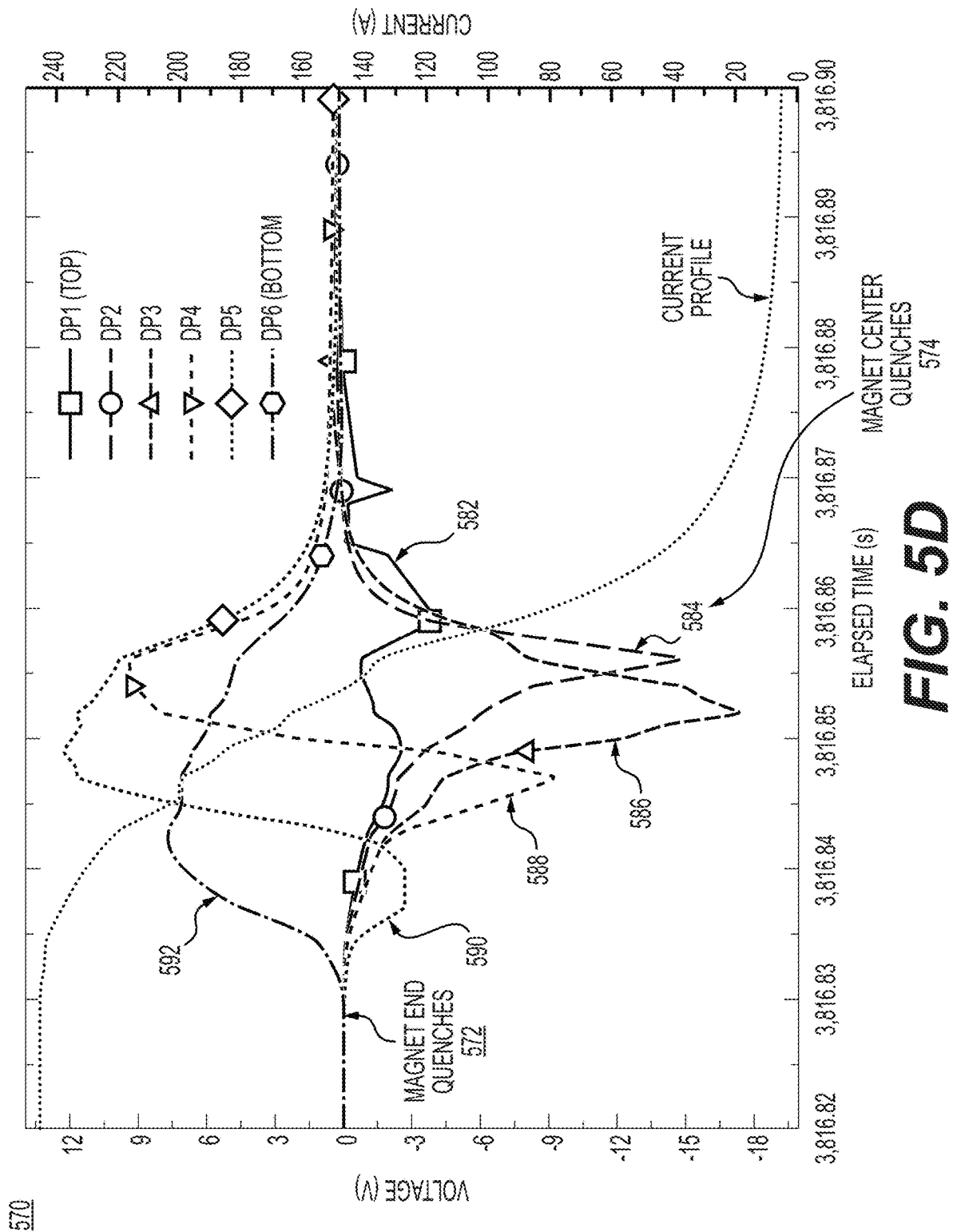

ADAPTABLE QUENCH COIL GUN

CROSS REFERENCE TO RELATED APPLICATION

This application claims priority to and benefit of U.S. Provisional Patent Application Ser. No. 63/281,854 entitled "ADAPTABLE QUENCH COIL GUN" filed Nov. 22, 2021, which is hereby incorporated by reference herein in its entirety as if fully set forth below.

STATEMENT REGARDING GOVERNMENT SUPPORT

This invention was made with government support under sponsor award DMR-1644779, NHMFL Renewal, awarded by the National Science Foundation. The government has certain rights in the invention.

BACKGROUND

Rail guns, and coil guns can be used to launch projectiles using magnetic forces. These devices operate using magnetic fields and magnetic field gradients to produce forces on an object, which accelerates the object (e.g. as a projectile). Any object that is magnetic or exhibits a magnetic induction can be accelerated thusly. Devices that produce force using magnetic fields and gradients can also have applications in any context where force is required. Therefore, what is needed are systems, devices and methods to overcome challenges in the art, in particular systems, devices, and methods to increase the acceleration, energy, rate of fire, and speed of projectiles launched from rail guns or coil guns.

SUMMARY

In one aspect the present disclosure relates a coil gun. In one embodiment, the coil gun includes a second pancake module, where the first pancake module and the second pancake module are each formed of a winding with an inner superconducting material layer and an outer ordinary conductor layer, where the first pancake module and the second pancake module are physically and/or inductively coupled to propagate a quench of a superconducting state of the first pancake module to the second pancake module.

In some embodiments, the coil gun further includes a plurality of pancake module configured to add to a magnetic field and a magnetic field gradient generated by the first pancake module or the second pancake module.

In some embodiments, the first pancake module and the second pancake module include yttrium barium copper oxide conductors or rare-earth barium copper oxide (REBCO) conductors.

In some embodiments, the first pancake module and the second pancake module include rare-earth barium copper oxide (REBCO).

In some embodiments, the first pancake module and the second pancake module include rare-earth barium copper oxide, where the rare earth can be any rare-earth element and/or or yttrium.

In some embodiments, the first pancake module and/or the second pancake module include a plurality of windings, where the plurality of windings are configured to cause a short-circuit connection between adjacent turns.

In some embodiments, the first pancake module and/or the second pancake module include copper as an electrically conducting material connecting adjacent turns of the windings in the first pancake module and/or the second pancake module.

In some embodiments, the first pancake module and the second pancake module include axially-wound tape conductors.

In some embodiments, the tape conductors are coated with a conductive material.

In some embodiments, the conductive material includes copper.

In some embodiments, the conductive material includes solder.

In some embodiments, the coil gun further includes a projectile.

In some embodiments, the projectile is greater than 25 mm in diameter.

In some embodiments, the projectile includes a magnetic alloy.

In some embodiments, the projectile includes a superconductor.

In some embodiments, the projectile includes a projectile coil and the projectile coil is configured to accept magnetic induction.

In some embodiments, the coil gun further includes a heater configured to quench a superconducting state of the first pancake module.

In some embodiments, the projectile is mechanically connected to a projectile coil, magnetic object, or electrically conductive object.

In some embodiments, the method of triggering the quench of the first superconducting state of the first coil includes applying a physical shock to a portion of the first coil.

In some embodiments, the method of triggering the quench of the first superconducting state of the first coil includes a physical interruption of the superconducting electrical continuity of a portion of the coil.

In some embodiments, the physical interruption is an interruption to the continuity of the superconductor.

In another aspect, the present disclosure relates to a method of operating a coil gun. In one embodiment, the method includes loading a projectile in the coil gun, where the coil gun includes a first pancake module and a second pancake module, and the first pancake module and the second pancake module are each formed of a winding with an inner superconducting material layer and an outer ordinary conductor layer, creating a first superconducting state in a first pancake module of the coil gun; creating a second superconducting state in a second pancake module of the coil gun, applying a current to the first pancake module and the second pancake module; quenching the first superconducting state of the first pancake module, where the first pancake module and the second pancake module are physically and/or inductively coupled to propagate a quench of a superconducting state of the first pancake module to the second pancake module; and releasing the projectile.

In some embodiments, the method includes quenching the first superconducting state of the first pancake module includes heating a portion of the first pancake module.

In some embodiments, the method includes quenching the first superconducting state of the first pancake module includes applying a physical shock to the first pancake module.

In some embodiments, the first superconducting state and second superconducting state are both quenched in less than 10 milliseconds.

In some embodiments, the method includes adjusting a contact resistance of the first pancake module or the second pancake module based on the mass of the projectile.

In some embodiments, the method includes adjusting an inter-turn resistance of the first pancake module or the second pancake module based on the mass of the projectile.

In some embodiments, the coil gun is configured as an orbital launch system and the projectile includes a payload.

In some embodiments, the coil gun is configured as an actuator and the projectile is operably coupled to a mechanism.

BRIEF DESCRIPTION OF THE DRAWINGS

The accompanying drawings, which are incorporated in and constitute a part of this specification, illustrate embodiments and together with the description, serve to explain the principles of the methods and systems:

FIG. 1C illustrates a block diagram of a coil gun that can include the double pancake modules illustrated in FIGS. 1A and 1B.

FIGS. 4A-4B illustrate a no-insulation superconducting magnet according to embodiments of the present disclosure. FIG. 4A illustrates an example coil structure, and FIG. 4B illustrates a computer model of the coil.

FIGS. 5A-5D illustrate the results of studies of example embodiments of the present disclosure. FIG. 5A illustrates a plot of critical currents for an example coil, showing a peak where the example coil is limited by field and field angle. FIG. 5B illustrates a shaded coil showing where the field is limited by field and field angle. FIG. 5C illustrates an electrical diagram of an example coil. FIG. 5D illustrates a plot of voltage and current over time as the magnetic field is quenched in example coil.

DETAILED DESCRIPTION

Figure 1A:
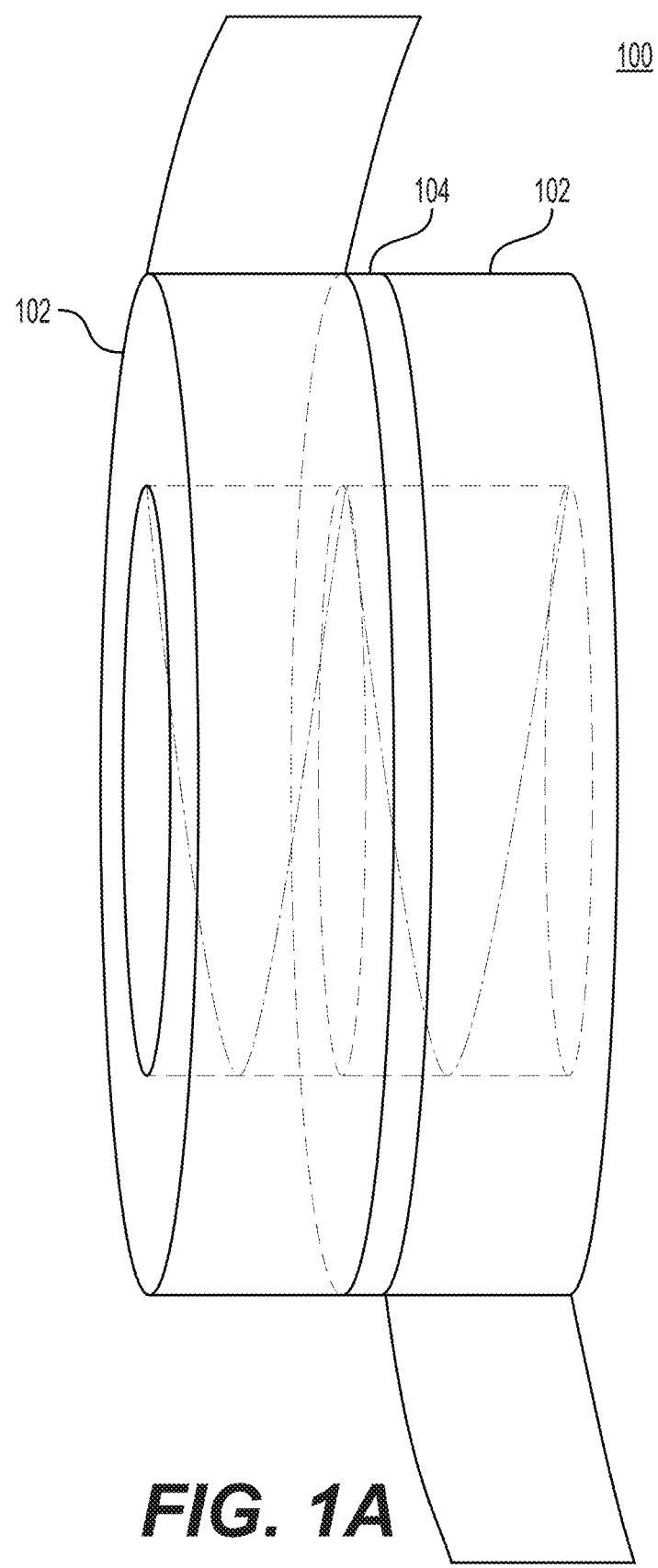
FIG. 1A illustrates a double pancake module that can be part of a coil gun according to embodiments of the present disclosure.

Before the present methods and systems are disclosed and described, it is to be understood that the methods and systems are not limited to specific synthetic methods, specific components, or to particular compositions. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the Examples included therein and to the Figures and their previous and following description.

Linear electromagnetic actuators, including electromagnetic catapults, rail guns, coil guns, "quench" guns, and linear motors can provide extremely high impulses per unit mass or unit volume. Embodiments of the present disclosure relate coil guns including no-insulation or metal-insulation coils. The terminology identifies the zero-resistance electrical property of a superconducting material relative to the electrical resistance of a common metal, where a common metal will not admit electrical current when in contact with a superconducting material in which a superconducting state is present. The common metal in this configuration thus behaves as an analog of an electrical insulator. Some embodiments of the present disclosure include HTS (high temperature superconducting) coils.

Embodiments of the present disclosure relate to a quench coil gun. The coils of the quench coil gun can be put into a superconducting state, and electricity is applied to the coils in order to produce a magnetic field. The magnetic field can be quenched, causing the magnetic field to be disrupted and form a magnetic gradient, and developing a force on a projectile located inside the magnetic field of the quench coil gun.

The "gun" can be formed by a stack of pancake or double-pancake "no-insulation" magnets wound with an anisotropic superconductor with conductive material between turns. With reference to FIG. 1A, an example implementation of a double pancake module 100 includes two "pancake" magnets 102 separated by a layer of insulator 104.

Figure 1B:
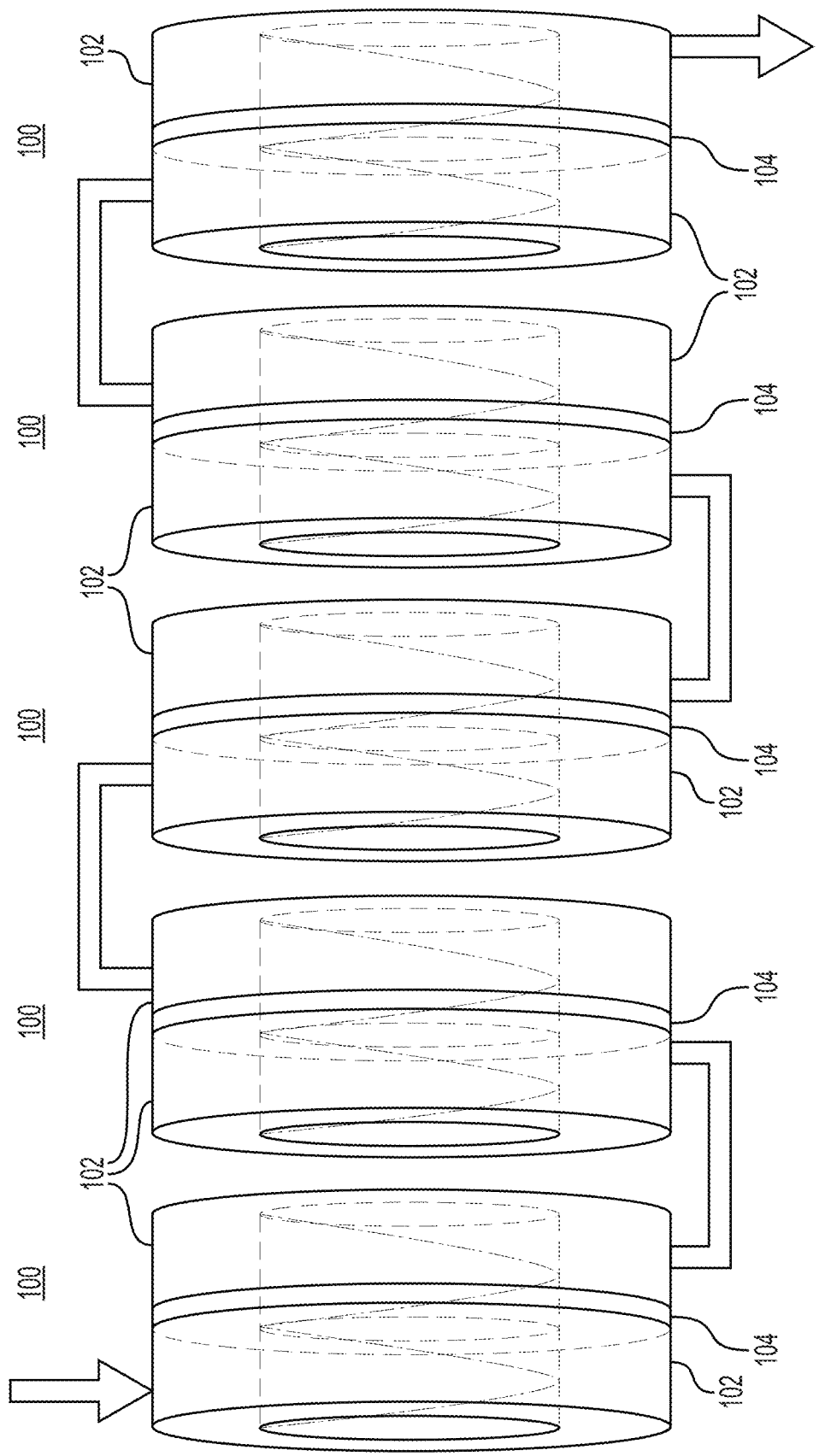
FIG. 1B illustrates multiple double pancake modules that can be used as part of a, coil for a coil gun, according to embodiments of the present disclosure.

As used herein, the terms "pancake," "pancake-wound," "pancake magnet," and "double pancake magnet" refer to structures of magnets that are wound radially outward from a hub. Radially wound magnets are an alternative to layer wound magnets. A pancake-wound magnet may not produce a uniform magnetic field. It should be understood that the radially wound "pancake" magnets described herein can be stacked to make a "coil" which can produce a uniform magnetic field. FIG. 1B illustrates an example of "stacking" the double pancake modules 100 shown in FIG. 1A to form a coil gun 150, which can be considered to be a single "coil."

With reference to FIG. 1B, the "gun" can include any number of double pancake modules 100, arranged in series. Alternatively or additionally, some or all of the double pancake modules 100 can be replaced with pancake modules include any number of windings, for example, a single pancake module. Each of the double pancake modules 100 shown in FIG. 1A or 1B can include any number of pancake magnets 102 separated by a respective layers of insulators 104. Each of the pancake magnets 102 may likewise be separated by a layer of an insulator (not shown), such as insulator 104. In some implementations, no insulators 104 are used. For example, an outer metallic layer of the double pancake module 100, such as the copper layer in REBCO tape, behave as insulation where electrical losses otherwise associated with a short circuit prevent the flow of current along paths other than within the superconductor when in a superconducting state. As such an additional insulator 104 may not be present.

Alternatively or additionally, the present disclosure contemplates that the pancake modules can be constructed by sub-dividing the pancake winding into two (or more) coaxial thin coils and layer(s) of structural material. This can reduce or prevent the accumulation of mechanical forces at the outer turns of the coil. In this manner, additional coils can be added to the "first" or "second" functional coils of a coil gun to behave as a unit.

With reference to FIG. 1C, pancake modules (e.g., the double pancake modules 100 illustrated in FIGS. 1A-1B) can be used to form a coil gun 150. In the example embodiment illustrated in FIG. 1C, the coil gun 150 includes five double pancake modules 100 fixed in place around a barrel 152. It should be understood that the five double pancake modules 100 illustrated in FIG. 1C are intended only as a non-limiting example, and that embodiments of the present disclosure can include any number of double pancake modules 100 or any number/combination of other types of pancake modules.

A coil gun 152 can include different configurations of magnets, or double pancake modules 100. For example the coil gun 152 can include co-axial coil(s) or conductive or magnetic objects. A co-axial coil or object placed inside the coil gun can be accelerated by appropriately shaping the field along the length of the outer coil that comprises the gun. The impulse applied to the co-axial coil or conductive or magnetic object can be fundamentally related to the rate of variation with position, or gradient, of magnetic field. In one embodiment where the coil gun is a solenoid, the gradient of magnetic field can be fundamentally determined by the central field strength B and the radius of the solenoid r.

The accelerating impulse can also depend fundamentally on the magnetic moment m of the co-axial coil or object within the coil gun. For a magnetic object, the magnetic moment can be determined by the product of the object's magnetization and its volume. For a coil, the magnetic moment can be determined by the flow of current in the coil and the area of the coil. For a conductive coil or object, current can be induced to flow when magnetic field external to the coil or object changes. In one embodiment, a conductive projectile initially held in the presence of the magnetic field of a coil gun will accelerate toward the center of field due to the induction of current in the projectile if the center of field is shaped to move away from the projectile.

Still with reference to FIG. 1C, the coil gun 150 can accelerate a projectile 160 by quenching a magnetic field of the double pancake modules 100. The present disclosure contemplates that the projectile 160 can be any material or structure that can receive a force from the magnetic gradient of the quench coil gun. Non-limiting examples of projectiles 160 that can be used in embodiments of the present disclosure include: Iron, steel, other magnetic metals and alloys, conductive metals such as copper and aluminum, permanent magnetic materials, and magnets formed using superconducting coils and superconducting solid masses. The present disclosure also contemplates that the projectiles can be different shapes and sizes. As a non-limiting example, a projectile shape that can be used is a 25 mm or larger "puck." The present disclosure also contemplates that the coil gun can be different lengths and diameters and therefore configured to move different projectiles. For example, the materials used to form the coil can have a minimum radius in which those materials can be bent, and that radius can determine the minimum diameter of the coil gun in some embodiments. Other sizes of coil gun and/or projectiles (e.g., smaller than 25 mm) are possible, and can be designed according to the limits of mechanical strength and induced stress. A non-limiting example of a coil is illustrated in FIG. 4A.

In some embodiments of the present disclosure, the coils of the coil gun can be structured as a "stacked pancake magnet" as shown in FIG. 4A. This configuration can include spacers (not shown) and a "bobbin" structure 402 to orient each coil in place. A non-limiting example of a material that can be used to form the coil is REBCO tape, which can cause an increased quench rate due to field rotation.

In embodiments of the present disclosure where the projectile is an electrically conductive material such as copper or aluminum, the projectile can be attracted toward the magnet center upon triggering a quench at one end by electrical current induced to flow in the conductive material. The fundamental behavior of induction can require such currents to flow so as to oppose the change in magnetic field, thereby attracting the conductive material toward the magnet center.

In embodiments of the present disclosure where the projectile 160 is a magnetic material such as iron, steel, or a permanent magnet, projectiles magnetized in the coil bore can also be attracted to field center. The projectile acceleration can be fundamentally related to its magnetization.

In embodiments of the present disclosure where the projectile 160 is an electromagnet, including embodiments where the projectile 160 is a superconducting coil, the polarity of the electromagnet can be adjusted to cause the projectile 160 to be attracted to the magnet center. In such embodiments, the mutual inductance between the projectile and the magnet fundamentally determines the acceleration of the projectile. Highly resistive, magnetic, or superconducting materials with flux pinning can have a slower response for induction for purposes of controlled actuation.

In embodiments of the present disclosure where the projectile 160 is a solid mass of superconductor, the induction of current in the projectile 160 during charging of the magnet can magnetize the projectile. Certain configurations of solid masses permit extremely high magnetizations far beyond iron and known permanent magnet materials. The saturation magnetization of iron is about 2 T. For comparison, superconductors can trap flux and behave like a permanent magnet. Field strengths of at least 17 T in a 25 mm diameter puck are possible.

Still with reference to FIG. 1C, the adaptable quench coil gun 150 can include devices configured to quench one or more of the double pancake modules 100. Throughout the present disclosure "Quench" refers to the loss of superconductivity in a magnet due to coupled magneto-thermal feedback. As a non-limiting example, quench can occur when a heater attached to one turn of a superconducting coil is activated. The heater can increase a turn of the coil above the critical temperature, causing the loss of superconductivity and the turn to become resistive. Accordingly, the current decays according to inductance and resistance, which are changing due to the propagating "quench zone" which corresponds to the portion of the coil gun 150 where the double pancake modules 100 are no longer superconducting. When multiple coils or quench zones exist, quench can propagate due to inductive coupling between the coils and quench zones, in addition to possible physical coupling. In some embodiments, the quenched coil(s) generates more heat, and the heat propagates to nearby turns of other coils. Alternatively or additionally, field rotation and radial current flow can also cause the quench zone to propagate. In some embodiments, field rotation and radial current flow can cause quench to propagate faster than heating.

In the adaptable quench coil gun 150 shown in FIG. 1C a heater 170 can be used to quench the field in one of the double pancake modules 100. In some embodiments of the present disclosure, heaters can be attached to multiple turns of the superconducting coil to heat those turns evenly and reduce thermal stress. Alternatively or additionally, any other device or method can be used to quench the double pancake modules 100. As a non-limiting example, any of the double pancake modules 100 can be quenched using a physical shock to one or more turn of the coil to create a small gap across the superconducting pathway that affects the properties of the coil.

When one of the double pancake modules 100 is quenched, a "quench zone" is created, as described herein. The temperature of the quenched coils increases, and that temperature increase can increase the temperature of the other coils, causing their temperature to increase. When the temperature of a coil increases above the critical temperature for the superconductor(s) in the coil, that coil is also quenched. This causes the quench zone to "propagate" as the increase in temperature caused by one coil being quenched causes other coils to be quenched, in turn increasing the temperature of those coils and causing them to heat up additional coils and thereby quench those additional coils.

When a superconducting coil is used, energy can be extracted from the magnetic field by quenching the superconducting state, e.g. by triggering a heater. The magnitude of the impulse is fundamentally determined by the energy stored in the magnet and the time scale over which the magnetic field can be discharged. Energy density scales as $B^2/mu\_0$, where B is the flux density produced by the coil and mu\_0 is the permeability of free space, so very high flux density can store more energy. Superconducting solenoids can surpass the flux density of conventional magnets. For example, superconducting solenoids can surpass the saturation magnetization of iron or permanent magnets by a factor of 10 or more.

The electro-thermal coupling of the quench process can determine the time scale over which energy is extracted from the magnetic field. The time scale can fundamentally depend on the thermal conductivity of the coil, the heat capacity of the coil materials, the electrical resistance of the coil in the normal-conducting state, and the inductance of the coil. Large coils used to produce high magnetic fields have high inductance and slow quench propagation.

A superconductor can have anisotropic properties with respect to field direction. In this case, quench can also occur when the orientation of field changes with respect to the crystallographic axes of the superconducting material. Anisotropic superconducting material can be arranged in tape form to align crystallographic axes with the plane of the tape. As a non-limiting example, quench can occur when the magnetic field direction rotates with respect to the plane of a tape superconductor to become aligned less favorably with the anisotropic superconducting material. Propagation of field rotation along a coil comprised of tape conductors can propagate a "quench zone".

In some implementations, since it is the natural property of a magnetic field to bend away from the axis of a solenoid near its ends, a quench gun coil made from anisotropic tape conductor can be most vulnerable to quench at the ends of the coil where the least favorable field direction is perpendicular to the tape and the tape is oriented to lay parallel to the axis of the solenoid. In some embodiments, tapes made from HTS materials can have less favorable properties for field oriented perpendicular to the tape plane, increasingly so as temperature is reduced.

Insulation can prevent short-circuits between coil turns and constrain the flow of electricity to follow the length of coil winding. Because a superconducting material can have zero or nearly zero electrical resistance, an ordinary conductor can appear to behave as insulation, where electrical losses otherwise associated with a short circuit prevent the flow of current along paths other than within the superconductor. In the absence of any electrical source, voltage, or induction, an ordinary conductor can constrain the flow of electricity to lie solely within a superconductor. Throughout the present disclosure, the terms "no-insulation" and "metal-insulation" magnet shall refer to a coil by which an ordinary metal is used to constrain the flow of electricity in the superconductor as described above.

When a no-insulation superconducting magnet is driven by a direct or induced voltage, both short-circuit and lengthwise current flow can occur. During magnet charging by a voltage source, the apportionment of short-circuit and lengthwise current is fundamentally determined by a ratio of inductances, where the short-circuit has the lowest fundamental value of inductance and the lengthwise current has inductance proportional to the number of coil turns. During magnet discharge, apportionment of short-circuit and lengthwise current also occurs for the same fundamental principles.

When quench occurs in a no-insulation superconducting magnet, the apportionment of short-circuit current can greatly change the inductance and can greatly reduce the lagging contribution of inductance to the quench time constant. The short-circuit current can also drive heat across coil turns. The decrease in time constant can scale by a factor given by the number of turns in a coil, which can be very large.

Propagation from one end to the other of the coil can be caused by inductive coupling, since the field rotation at the end of the coil can move toward the next coil when superconductivity at the end coil is lost, thereby tilting the magnetic field away from the solenoid axis at the subsequent coil.

Figure 2A:
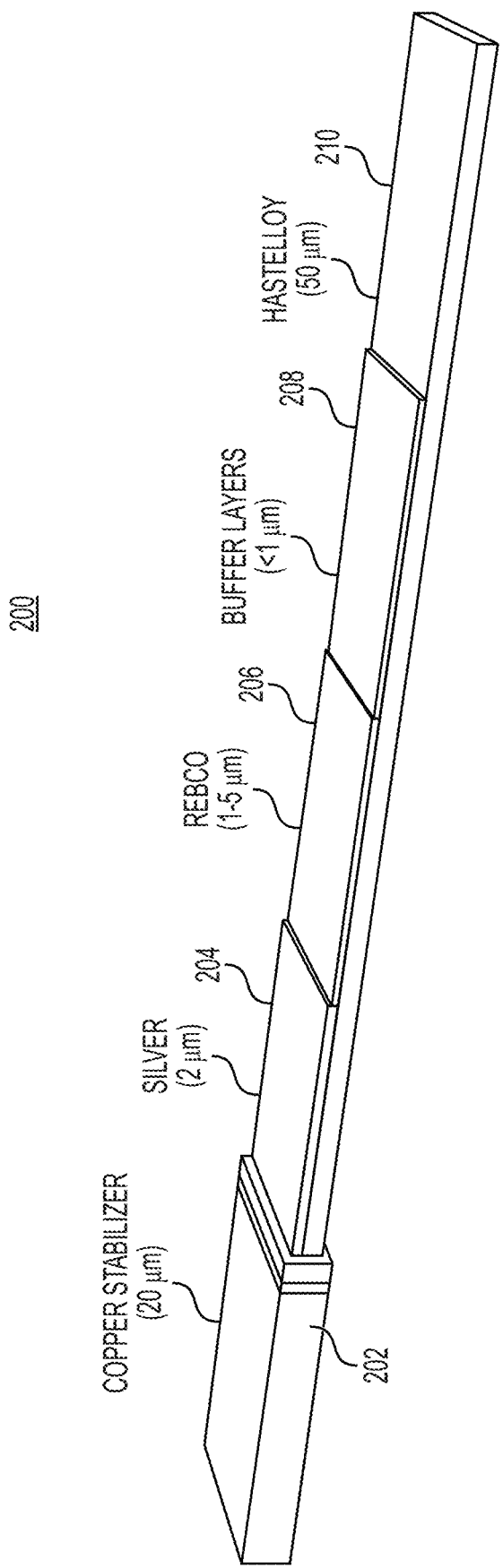
FIG. 2A illustrates a copper coated tape conductor that can be used to form coils in embodiments of the present disclosure.

In some embodiments of the present disclosure, tape conductors such as REBCO tape can be used to form the double pancake modules 100 shown in FIGS. 1A-1C. An example of REBCO tape 200 is shown in FIG. 2A. The REBCO tape is a high temperature superconductor that can be formed using a copper layer 202, a silver layer 204, a REBCO layer 206, buffer layers 208, and a Hastelloy layer 210, as shown in FIG. 2A. The structure of REBCO tape 200 can be such that all of the superconducting material is aligned with the tape plane, with the least favorable field direction lying perpendicular to the tape plane. At superconducting temperatures, the copper layer 202 of the REBCO tape 200 acts as an insulator to the REBCO layer 206, ensuring the generation of a large magnetic flux in the coil by virtue of electrical current flowing along the REBCO superconductor. Upon a quench event (e.g., application of a heater), the copper layer acts 202 as a conductor, creating a short circuit across the turns of the REBCO tape 200, thereby collapsing the magnetic field, leading to a large magnetic gradient. It should be understood that REBCO tape is provided as a non-limiting example, and that other types of tape conductors can be used.

Figure 2B:
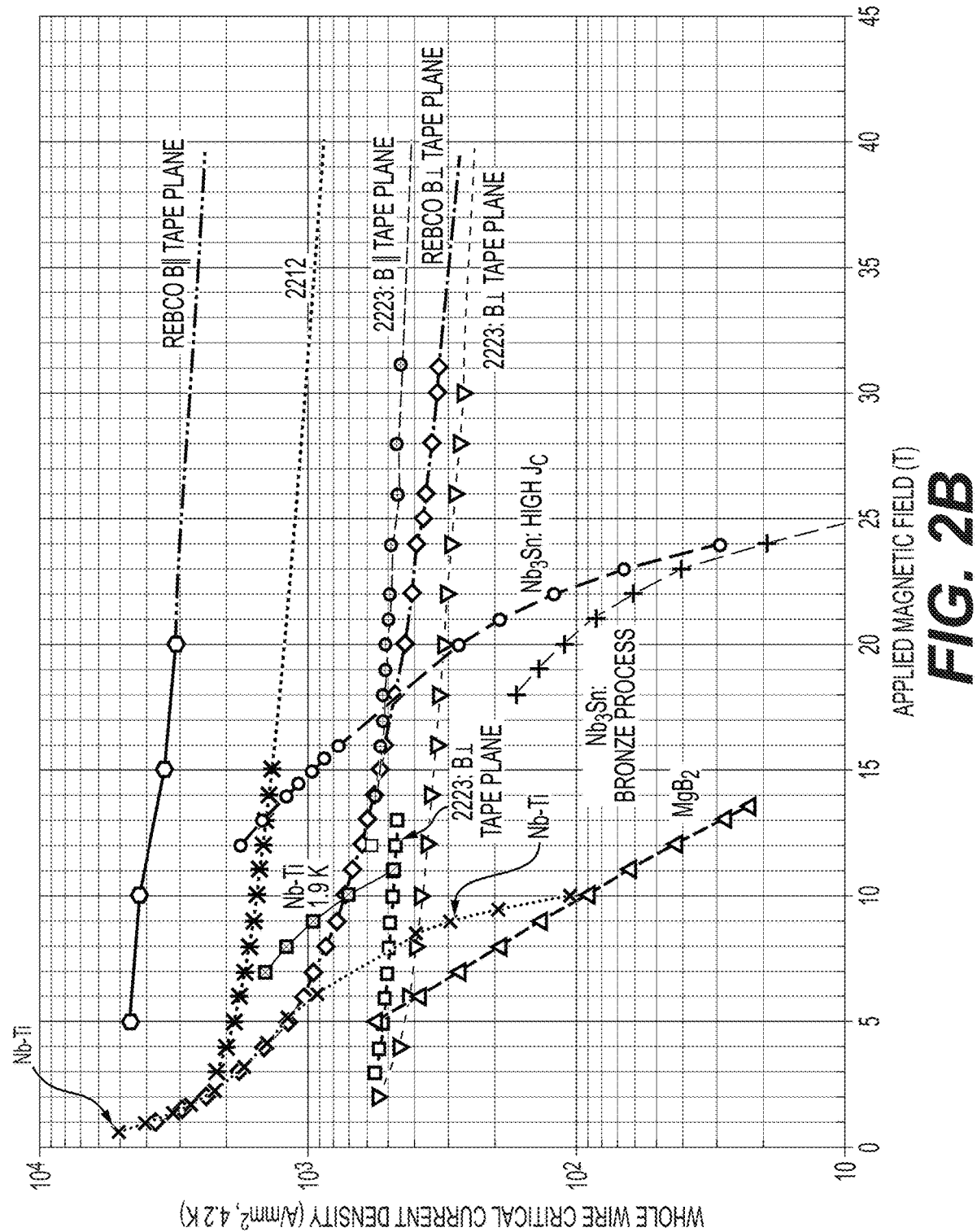
FIG. 2B illustrates example properties of the conductors that can be used in embodiments of the present disclosure, including the copper coated tape conductor illustrated in FIG. 2A.

In some embodiments of the present disclosure, the tape conductors are axially wound to form the pancake modules. Axial winding can cause quench to propagate FIG. 2B illustrates example properties of example conductors that can be used in embodiments of the present disclosure, including the REBCO tape conductor illustrated in FIG. 2A.

The present disclosure contemplates that other conductors can be used, such as the family of cuprate superconductors, non-limiting examples of which include BSCCO BSCCO (e.g. Bi-2212 or $Bi_2Sr_2CaCu_2O_{10}$ and Bi-2223 or $Bi_2Sr_2Ca_2Cu_3O_{14}$). Additionally the pnictide family of superconductors can also be used, a non-limiting examples of which is BaFeAs(O,F). High current-density conductors, including REBCO tape, can achieve greater field strengths and gradients.

The present disclosure also contemplates that the magnets (e.g., the double pancake modules 100 shown in FIGS. 1A-1C) can be separated from each other by a metal insulation, such as a copper coating, aluminum coating, or silver paint or solder. The present disclosure further contemplates that the rate of quench propagation can be adjusted by varying the electrical conductivity of the metal insulation, the geometric coverage of the superconductor with metal insulation, or the topography of the metal insulation.

Some embodiments of the present disclosure include anisotropic materials. Examples of anisotropic materials include the family of cuprate superconductors, non-limiting examples of which include Bi-2212 and Bi-2223 as well as the pnictide family of superconductors, a non-limiting example of which is BaFeAs(O,F). In general, high temperature superconductors such as REBCO, are anisotropic. Anisotropic materials can enable triggering quench at the end of the coil and facilitate rapid propagation due to field rotation instead of conductor heating. The present disclosure contemplates that the current density of the coils can be adjusted to control propagation through the coils.

Some embodiments of the present disclosure are configured to cause the quench zone to propagate (i.e., move) quickly through the coil gun. For example, a 10 ms "quench rate" is possible in embodiments of the present disclosure.

The force on the projectile can be equal or approximately equal to the field strength times the gradient, so increasing the rate of quench can cause an increased gradient and increased forces on the projectile. The field strength of the quench coil gun can be related to the current density and number of turns in the coils. The quench rate can be related to the properties of the metal insulation and the anisotropy of the superconductor.

Figure 3:
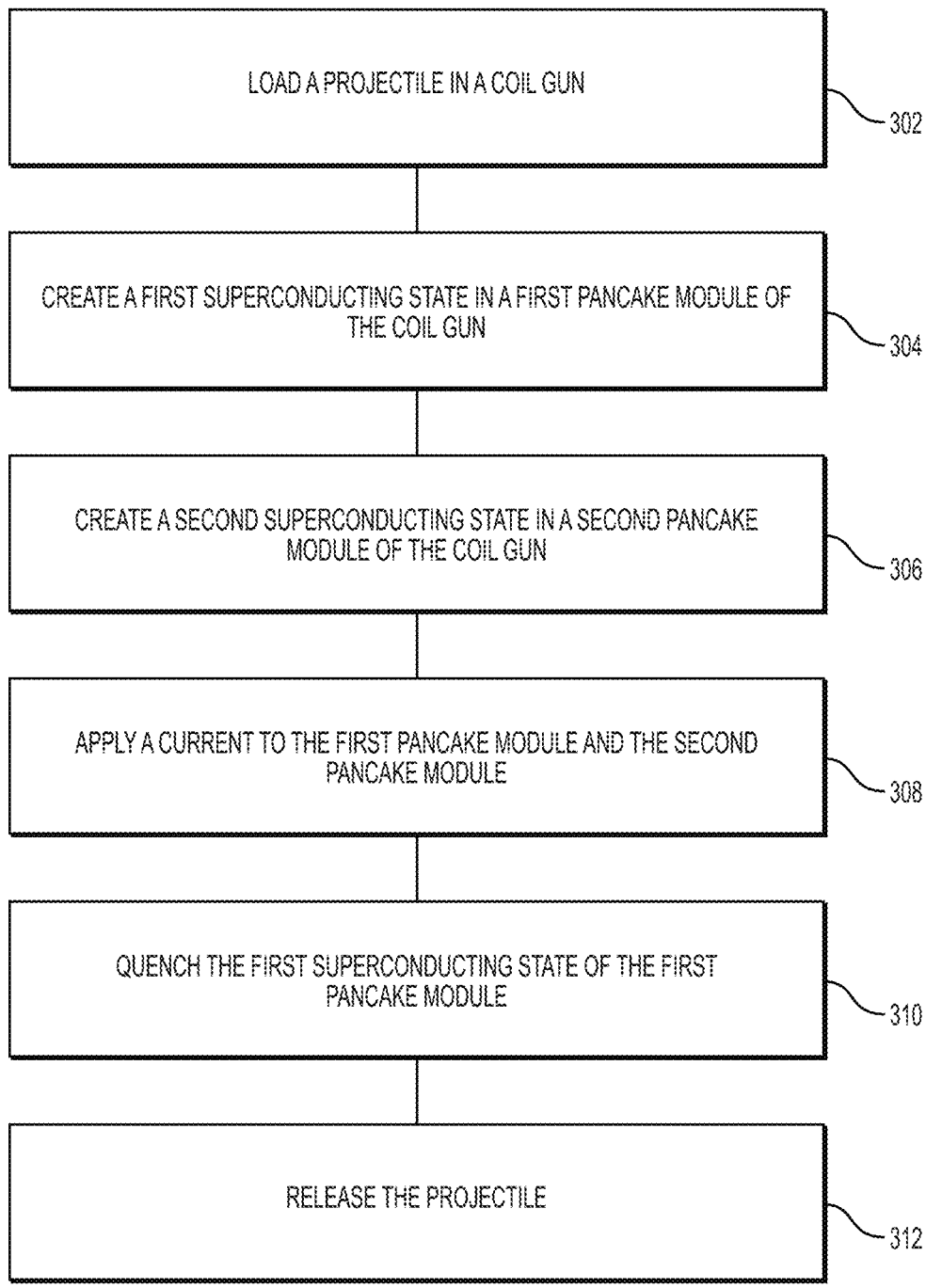
FIG. 3 illustrates a method for operating a coil gun, according to embodiments of the present disclosure.

With reference to FIG. 3, embodiments of the present disclosure also include methods 300 of operating the adaptable quench coil gun. The method can include loading a projectile into the coil gun at step 302. In the example method 300 shown in FIG. 3, the projectile can be loaded at zero field into the coil gun, but in some embodiments of the present disclosure the projectile can be loaded when there is a magnetic field in the coil gun. Alternatively or additionally, in some embodiments, the projectile can be loaded when the first and/or second coil of the coil gun are in a superconducting state, but when the magnetic field is not being applied.

At step 304, a first superconducting state is created in the first coil of the coil gun. At step 306, a second superconducting state is created in the second coil of the coil gun. When the first coil and/or second coil are in superconducting states, the coils can carry a high current and therefore produce large magnetic fields inside the coil gun that can act on the projectile. At step 308, a current is applied to the first coil and the second coil, which generates a magnetic field that can act on the projectile. The magnetic field inside the adaptable quench coil gun can be ramped up, and the projectile can be pulled toward end of magnet.

At step 310, the superconducting state of the first coil is quenched. As described herein, quenching can be performed using heating, physical shock, or any other technique that causes a material to no longer act as a superconductor.

At step 312, the projectile is released. It should be understood that the projectile can be released at different times in different embodiments of the present disclosure. For example, in some embodiments the projectile can be released before quenching the first coil, and in other embodiments the projectile can be released after quenching the first coil, or the projectile can be released at the same time that the first coil is quenched. Optionally, the release of the projectile can be timed to coincide with the magnetic field quench.

Embodiments of the present disclosure are designed to control the rate of quench based on the acceleration of the projectile launched by the coil gun. It can be advantageous to increase the rate of quench propagation as the projectile accelerates. The present disclosure contemplates that the inter-turn resistance can be adjusted along the length of the coil in order to affect the rate of quench. For example, a higher inter-turn resistance can cause slower quench rates. Inter-turn resistance depends on the resistivity of the material making electrical connection between turns and on the geometric area of contact between the turns. Either or both contributions can be manipulated to affect quench rate.

The present disclosure also contemplates that by potting coils in solder (e.g. silver solder), the quench propagation rate can be increased. The present disclosure also contemplates that the contact resistance of the coil(s) can be tuned in time with the payload mass to optimize the coil gun efficiency. Similarly, the present disclosure contemplates that the conductor can be "graded" so that different critical currents are assigned to different "pancakes" of each coil. This can also be used to control the quench rate. FIG. 4B illustrates an embodiment of the present disclosure where different coils are modeled with different characteristics.

Embodiments of the present disclosure can include superconducting tapes with extremely high current density to attain highest practical flux density for the drive coil, where a >22 T field has been demonstrated.

Embodiments of the present disclosure can include a "no insulation" or "metal insulation" superconductor construction, whereby superconducting turns can become spontaneously converted into a single-turn normal conductor capable of extremely fast discharge rates. Embodiments of the present disclosure can discharge within 10 ms.

The resistivity of inter-turn contacts determines the discharge rate, embodiments of the present disclosure can tune the impulse by modifying the "metal insulation" component between turns. This permits impulse to be tailored to the mechanical limits of the projectile.

Embodiments of the present disclosure can enable an energy density a factor of 100 higher than conventional devices. Embodiments of the present disclosure can be used for a wide variety of applications by delivering superior energy density. These applications can include airplane launch systems, orbital launch systems, robotic actuators, and projectile launching systems.

EXAMPLES

An example quench coil gun designed according to some embodiment of the present disclosure was studied. The example quench coil gun can include features configured to propagate quench rapidly and deliver a high acceleration and/or force to a projectile. The example quench coil gun can include anisotropic superconductors that can allow quench to start at one end due to field rotation; isotropic conductors can be less stable in the coil center and can result in symmetric quench propagation (and little acceleration). As described above, the example quench coil gun can also be designed with no insulation between windings, which can allow for the quench to propagate rapidly.

The example quench coil gun can also include high temperature superconductors, which can have a high critical temperature so that the short-circuit losses are not able to quench the magnet while it is being (slowly) charged. Additionally, the example quench coil gun can include double pancake windings that can propagate quench axially.

Example embodiments of the present disclosure were studied. With reference to FIG. 4A, an example coil was constructed, and with reference to FIG. 4B, a simulation was performed of an example coil.

Figure 5A:
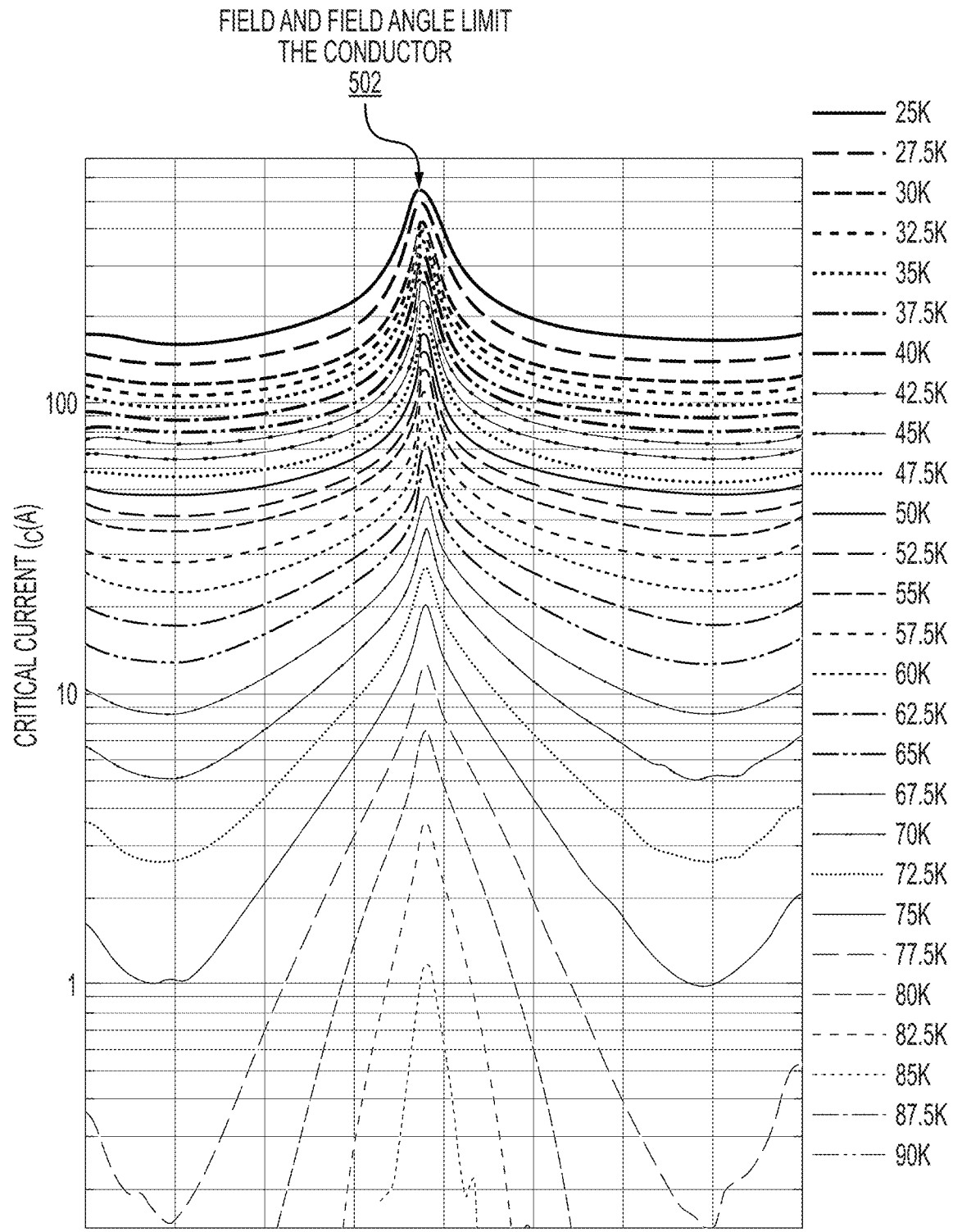
Figure 5B:
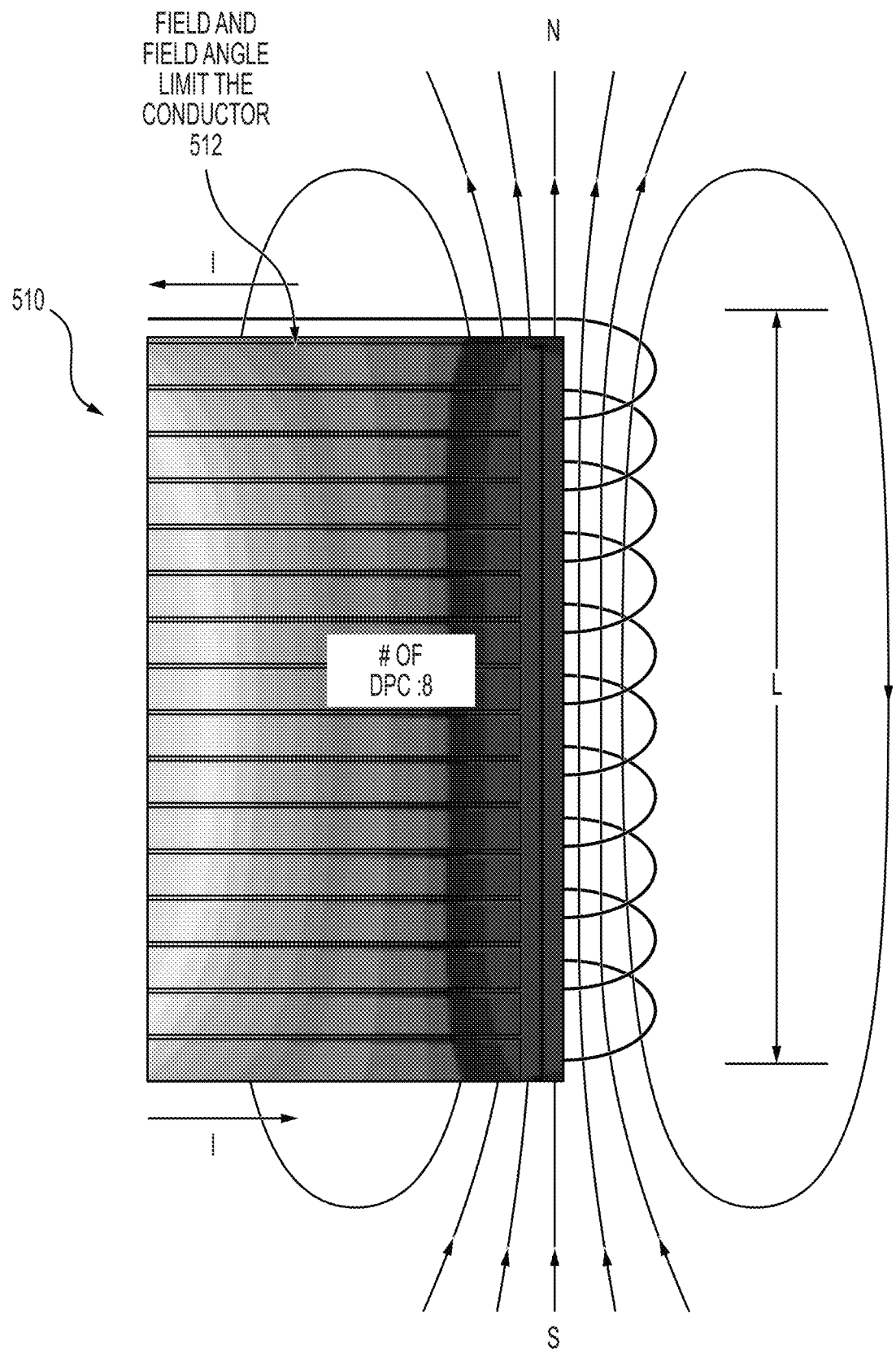

FIGS. 5A-5D illustrate the results of studies of example embodiments of the present disclosure. FIG. 5A illustrates a plot of critical currents for an example coil, showing a peak 502 where the example coil is limited by field and field angle. FIG. 5B illustrates a shaded coil 510 including an area 512 where the field is limited by field and field angle.

Figure 5C:
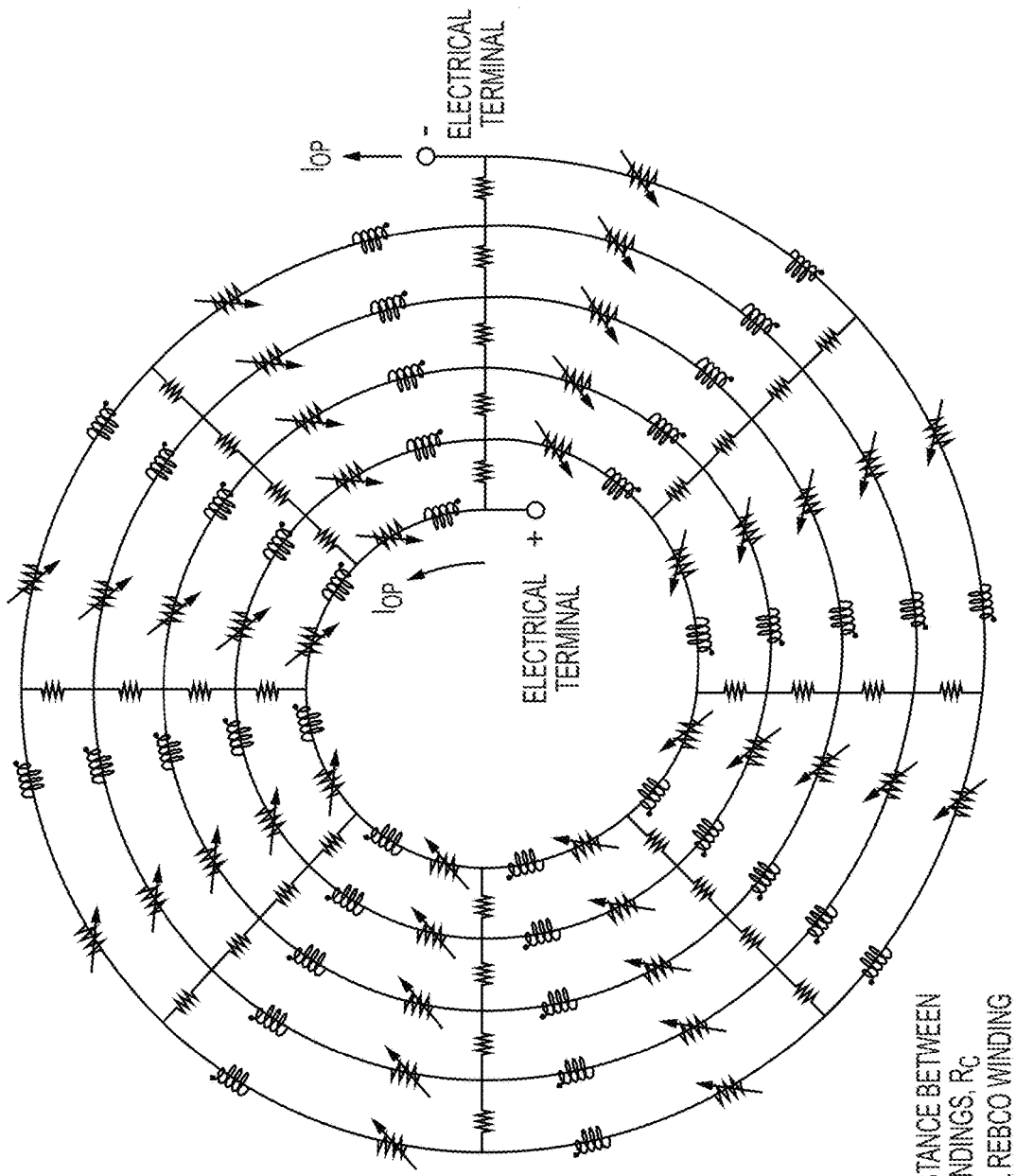

FIG. 5C illustrates an electrical diagram 550 of an example coil. FIG. 5D illustrates a plot 570 of voltage and current over time as the magnetic field is quenched in example coils. The time when the magnet end quenches is marked 572 and the time when the magnet center quenches is marked 574. The example embodiment shown in FIG. 5D includes 6 double pancake modules. The performance of the first double pancake module "DP1" is shown as line 582, the performance of the second double pancake module "DP2" is shown as line 584, the performance of the third double pancake module "DP3" is shown as line 586, the performance of the fourth double pancake module "DP4" is shown as line 588, the performance of the fifth double pancake module "DP5" is shown as line 590, and the performance of the sixth double pancake module is shown as line 592. It should be understood that the six double pancake modules in the example embodiment are a non-limiting example, and that any number of pancake modules and types of pancake modules (e.g., single, double, triple, etc.) can be used in different embodiments of the present disclosure.

In the example embodiments studied, the quench was propagated due to inductive coupling between the coils. The quench in a REBCO pancake magnet can be faster than other pancake magnets due to field rotation. During the quench process a transfer can occur to radial current, which can cause a piling up of the flux concentrated in the magnet bore and rotate the field outward. The study also showed that high current density conductors can achieve large fields and gradients that are advantageous for some embodiments of the present disclosure.

Additionally, the study of the example embodiments showed that anisotropic materials can enable the quench to be triggered at the end of the coil and allow for rapid quench propagation due to field rotation in addition to, or as an alternative to, conductor heating. In the example embodiments, field rotation and radial current flow can facilitate flux collapse along the coil.

It should be appreciated that the logical operations described herein with respect to the various figures may be implemented (1) as a sequence of computer implemented acts or program modules (i.e., software) running on a computing device (e.g., the computing device described in FIG. 6), (2) as interconnected machine logic circuits or circuit modules (i.e., hardware) within the computing device and/or (3) a combination of software and hardware of the computing device. Thus, the logical operations discussed herein are not limited to any specific combination of hardware and software. The implementation is a matter of choice dependent on the performance and other requirements of the computing device. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

Figure 6:
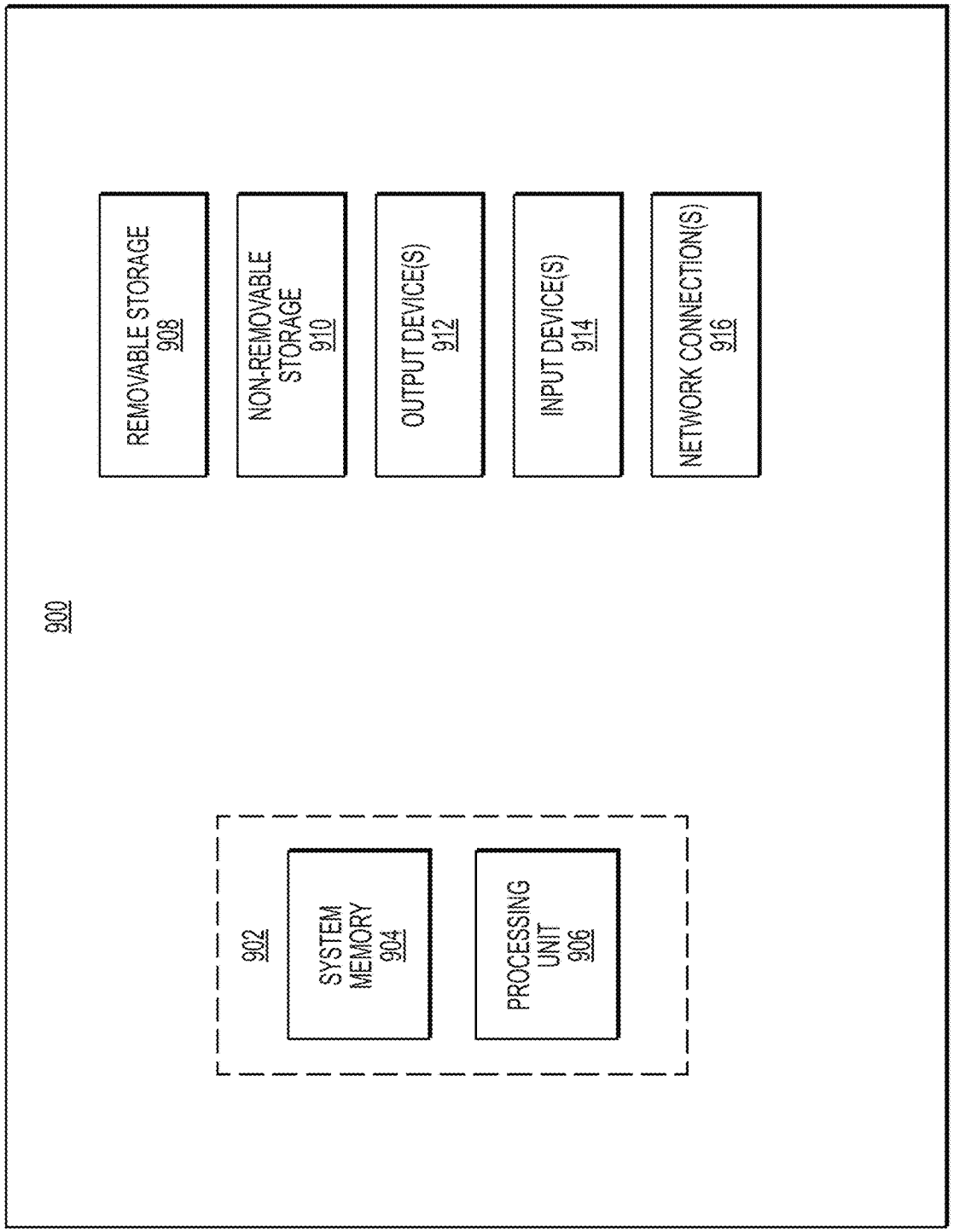
FIG. 6 is an example computing device.

Referring to FIG. 6, an example computing device 600 upon which the methods described herein may be implemented is illustrated. It should be understood that the example computing device 600 is only one example of a suitable computing environment upon which the methods described herein may be implemented. Optionally, the computing device 600 can be a well-known computing system including, but not limited to, personal computers, servers, handheld or laptop devices, multiprocessor systems, microprocessor-based systems, network personal computers (PCs), minicomputers, mainframe computers, embedded systems, and/or distributed computing environments including a plurality of any of the above systems or devices. Distributed computing environments enable remote computing devices, which are connected to a communication network or other data actuator medium, to perform various tasks. In the distributed computing environment, the program modules, applications, and other data may be stored on local and/or remote computer storage media.

In its most basic configuration, computing device 600 typically includes at least one processing unit 606 and system memory 604. Depending on the exact configuration and type of computing device, system memory 604 may be volatile (such as random access memory (RAM)), non-volatile (such as read-only memory (ROM), flash memory, etc.), or some combination of the two. This most basic configuration is illustrated in FIG. 5 by dashed line 602. The processing unit 606 may be a standard programmable processor that performs arithmetic and logic operations necessary for operation of the computing device 600. The computing device 600 may also include a bus or other communication mechanism for communicating information among various components of the computing device 600.

Computing device 600 may have additional features/functionality. For example, computing device 600 may include additional storage such as removable storage 608 and non-removable storage 610 including, but not limited to, magnetic or optical disks or tapes. Computing device 600 may also contain network connection(s) 616 that allow the device to communicate with other devices. Computing device 600 may also have input device(s) 614 such as a keyboard, mouse, touch screen, etc. Output device(s) 612 such as a display, speakers, printer, etc. may also be included. The additional devices may be connected to the bus in order to facilitate communication of data among the components of the computing device 600. All these devices are well known in the art and need not be discussed at length here.

The processing unit 606 may be configured to execute program code encoded in tangible, computer-readable media. Tangible, computer-readable media refers to any media that is capable of providing data that causes the computing device 600 (i.e., a machine) to operate in a particular fashion. Various computer-readable media may be utilized to provide instructions to the processing unit 606 for execution. Example tangible, computer-readable media may include, but is not limited to, volatile media, non-volatile media, removable media and non-removable media implemented in any method or technology for storage of information such as computer readable instructions, data structures, program modules or other data. System memory 604, removable storage 608, and non-removable storage 610 are all examples of tangible, computer storage media. Example tangible, computer-readable recording media include, but are not limited to, an integrated circuit (e.g., field-programmable gate array or application-specific IC), a hard disk, an optical disk, a magneto-optical disk, a floppy disk, a magnetic tape, a holographic storage medium, a solid-state device, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices.

In an example implementation, the processing unit 606 may execute program code stored in the system memory 604. For example, the bus may carry data to the system memory 604, from which the processing unit 606 receives and executes instructions. The data received by the system memory 604 may optionally be stored on the removable storage 608 or the non-removable storage 610 before or after execution by the processing unit 606.

It should be understood that the various techniques described herein may be implemented in connection with hardware or software or, where appropriate, with a combination thereof. Thus, the methods and apparatuses of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computing device, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

CONCLUSION

It will be understood that each step of a method, block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

It should be understood that the various techniques described herein may be implemented in connection with hardware or software or, where appropriate, with a combination thereof. Thus, the methods and apparatuses of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computing device, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

While this specification contains many specific implementation details, these should not be construed as limitations on the claims. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

It should be appreciated that the logical operations described herein with respect to the various figures may be implemented (1) as a sequence of computer implemented acts or program modules (i.e., software) running on a computing device, (2) as interconnected machine logic circuits or circuit modules (i.e., hardware) within the computing device and/or (3) a combination of software and hardware of the computing device. Thus, the logical operations discussed herein are not limited to any specific combination of hardware and software. The implementation is a matter of choice dependent on the performance and other requirements of the computing device. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein. It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A coil gun, comprising:
   a barrel, a first pancake module and a second pancake module the first and second pancake modules being positioned around the barrel; and
   a voltage source configured to energize the first and second pancake modules;
   wherein the first pancake module and the second pancake module are each formed of a winding with an inner superconducting material layer and an outer ordinary conductor layer, wherein the first pancake module and the second pancake module are physically and/or inductively coupled to propagate a quench of a superconducting state of the first pancake module to the second pancake module; and wherein the superconducting state of the first pancake module is configured to be quenched by applying a physical shock to the first pancake module.

2. The coil gun of claim 1, further comprising a plurality of pancake modules configured to add to a magnetic field and a magnetic field gradient generated by the first pancake module or the second pancake module.

3. The coil gun of claim 1, wherein the first pancake module or the second pancake module comprise an anisotropic material.

4. The coil gun of claim 1, wherein the first pancake module and the second pancake module comprise yttrium barium copper oxide conductors or rare-earth barium copper oxide (REBCO) conductors.

5. The coil gun of claim 1, wherein the first pancake module and the second pancake module comprise axially-wound tape conductors.

6. The coil gun of claim 5, wherein the tape conductors are coated with a conductive material.

7. The coil gun of claim 6, wherein the conductive material comprises copper or solder.

8. The coil gun of claim 1, further comprising a projectile.

9. The coil gun of claim 8, wherein the projectile is greater than 25 mm in diameter.

10. The coil gun of claim 8, wherein the projectile comprises a magnetic material or a superconductor.

11. The coil gun of claim 8, wherein the projectile comprises a projectile coil and the projectile coil is configured to accept magnetic induction.

12. The coil gun of claim 1, wherein the coil gun further comprises a heater configured to quench a superconducting state of the first pancake module.

13. A method of operating a coil gun, the method comprising:
   loading a projectile into a barrel of the coil gun, wherein the coil gun further comprises a first pancake module and a second pancake module each positioned around the barrel, and the first pancake module and the second pancake module are each formed of a winding with an inner superconducting material layer and an outer ordinary conductor layer,
   creating a first superconducting state in a first pancake module of the coil gun; creating a second superconducting state in a second pancake module of the coil gun,
   applying a current to the first pancake module and the second pancake module using a voltage source;
   quenching the first superconducting state of the first pancake module by applying a physical shock to the first pancake module, wherein the first pancake module and the second pancake module are physically and/or inductively coupled to propagate a quench of a superconducting state of the first pancake module to the second pancake module; and
   releasing the projectile.

14. The method of claim 13, wherein quenching the first superconducting state of the first pancake module comprises heating a portion of the first pancake module.

15. The method of claim 13, wherein the first superconducting state is quenched in less than 10 milliseconds.

16. The method of claim 13, further comprising adjusting a contact resistance of the first pancake module or the second pancake module based on the mass of the projectile.

17. The method of claim 13, further comprising adjusting an inter-turn resistance of the first coil or the second coil based on the mass of the projectile.

18. The method of claim 13, wherein the coil gun is configured as an orbital launch system and the projectile comprises a payload.

19. The method of claim 13, wherein releasing the projectile occurs simultaneously with the step of quenching the first superconducting state of the first pancake module.

\* \* \* \* \*